United States Patent
Okamura et al.

[11] Patent Number: 6,155,716
[45] Date of Patent: Dec. 5, 2000

[54] GUIDE APPARATUS FOR BIAXIAL SHIFTING MOTION AND UNIAXIAL TURNING MOTION

[75] Inventors: Satoru Okamura; Yoichi Fukasawa, both of Tokyo-to, Japan

[73] Assignee: THK Co., Ltd., Tokyo-to, Japan

[21] Appl. No.: 09/245,880

[22] Filed: Feb. 8, 1999

[30] Foreign Application Priority Data

Feb. 26, 1998 [JP] Japan .................. 10-062230

[51] Int. Cl.[7] .......................... F16C 17/00; F16C 29/00; F16C 31/00
[52] U.S. Cl. ........................................ 384/7; 384/48
[58] Field of Search ........................ 384/7, 45, 48, 384/55, 50, 51, 52, 44

[56] References Cited

U.S. PATENT DOCUMENTS

| | | | |
|---|---|---|---|
| 4,118,101 | 10/1978 | Teramachi | 384/7 |
| 5,249,867 | 10/1993 | Iida | 384/45 |
| 5,290,106 | 3/1994 | Ichida | 384/45 |
| 5,391,003 | 2/1995 | Ooya | 384/44 |

Primary Examiner—Charles A Marmor
Assistant Examiner—Tisha D. Waddell
Attorney, Agent, or Firm—Young & Thompson

[57] ABSTRACT

A guide apparatus for biaxial shifting motion and uniaxial turning motion comprises a biaxial shifting guide mechanism and a pivot supporting mechanism. The biaxial shifting motion guide mechanism supports a second member so as to be movable relative to a first member in a constant posture state along biaxial lines intersecting at right angles with each other. The pivot supporting mechanism is disposed on the biaxial shifting motion guide mechanism at an opposite side of the first member and pivotably supports the second member.

8 Claims, 11 Drawing Sheets

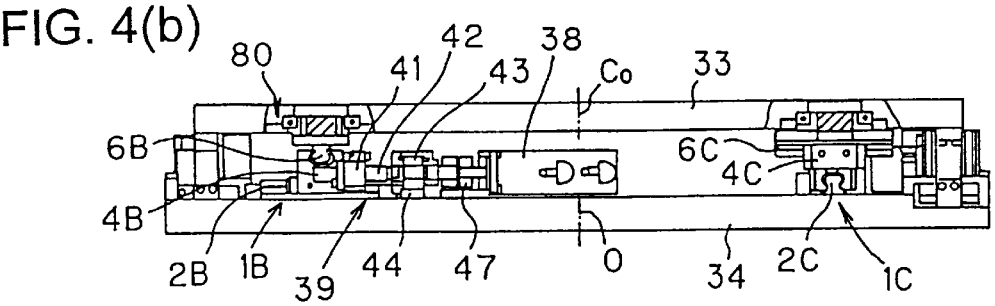
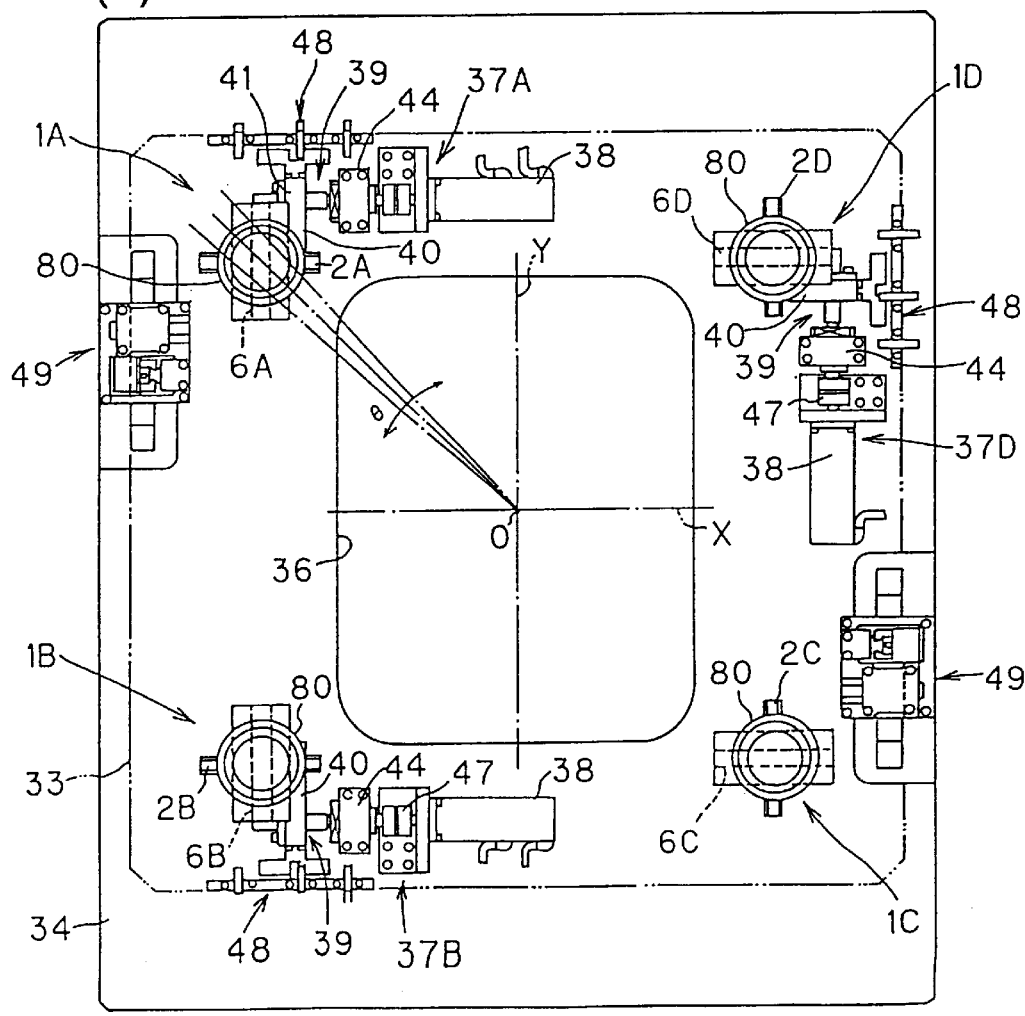

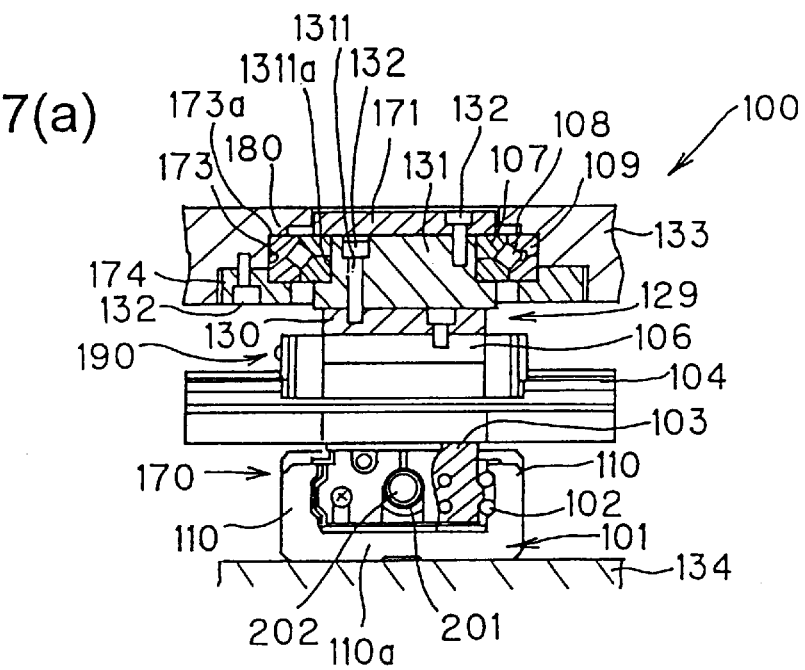

GUIDE APPARATUS FOR BIAXIAL SHIFTING MOTION AND UNIAXIAL TURNING MOTION

BACKGROUND OF THE INVENTION

1. Field of the Invention

The present invention relates to a guide apparatus for biaxial shifting motion and uniaxial turning motion.

2. Description of the Related Art

There has already been known a guide apparatus for biaxial shifting motion and uniaxial turning motion disclosed for example in Japanese Patent Provisional Publication No. H8-99243.

In the above-mentioned guide apparatus, a linear motion guide apparatus composed of a guide rail and a movable block is combined with the other linear motion guide apparatus having the same structure so that the movable block of the former is pivotably connected through a pivot supporting mechanism to the movable block of the latter. The guide rail of the former linear motion guide apparatus is fixed to a base and the guide rail of the latter liner motion guide apparatus is fixed to a table. A plurality of guide apparatus each having such a structure are used to form a table for biaxial shifting motion and uniaxial turning motion.

The above-described conventional guide apparatus for biaxial shifting motion and uniaxial turning motion however has the following problems.

In the conventional guide apparatus, two guide rails defining biaxial directions respectively turn on the plane defined by the biaxial lines. As a result, there is difficulty in control of turning motion at a point other than the origin of the coordinate axes and of shifting motion in longitudinal and lateral directions (i.e., X and Y directions) after the turn by a prescribed turning angle. When a table 103 turns as shown in FIG. 11 at the origin of the coordinate axes with the use of three sets of guide apparatus for biaxial shifting motion and uniaxial turning motion 100, 101, 102, movable guide rails 100Y, 101X, 102X of the guide apparatus 100, 101, 102 incline relative to stationary guide rails 100X, 101Y, 102Y. A translation operation of the table 103 from the above-mentioned condition requires a parallel movement of each of the movable guide rails 100Y, 101X, 102X as well as a proper maintenance of the inclined angle of the movable guide rails 100Y, 101X, 102X relative to the stationary guide rails 100OX, 101Y, 102Y, thus leading to an extremely complex control.

It is actually difficult to dispose the pivot supporting mechanism between the movable blocks of the linear motion guide apparatus. More specifically, when the pivot supporting mechanism having outer and inner rings is disposed between the movable blocks, the outer ring is for example secured to one of the movable blocks and the inner ring is secured to the other of them. Accordingly, it is necessary to form a hole on the one movable block, into which the outer ring can be fitted, to form a projection on the other movable block, which can be fitted into the inner surface of the inner ring, and to provide a means for preventing the pivot supporting mechanism from coming out, thus requiring a complex structure.

There is also required a proper squareness of the bottom surface of each of the guide rails secured to the base and the table, respectively, relative to the pivot axis of each of the pivot supporting mechanisms. The squareness is determined for example by the fitting surfaces of the outer ring and the portion of the one movable block, which forms the hole as well as the fitting surfaces of the inner ring and the projection formed on the other movable block, as described above. Combination of a working error in diametrical length of the hole formed on the one movable block with an improper squareness of the inner peripheral surface of the portion of the one movable block, which forms the hole, combination of a working error in diametrical length of the outer periphery of the projection formed on the other movable block with an improper squareness of the outer peripheral surface of the projection, and combination of working errors in an outer diametrical length of the outer ring and an inner diametrical length of the inner ring are complicated and there cannot be obtained a proper squareness of the bottom surface of the guide rail relative to the pivot axis of the pivot supporting mechanism.

An improper squareness causes a wavy movement of the table when the table turns, thus making it impossible to carry out a positional determination with high precision. A conceivable method of disposing a guide mechanism between the movable blocks in order to obtain a proper squareness leads to a complicated structure.

A plurality of holes for bolts for fixing the guide rails to the table are required to be formed thereon. In this case, it is necessary to apply a precise working to the table to form the hole with a prescribed proper pitch.

When force is applied to the table at a position apart from the pivot axis of the guide apparatus for biaxial shifting motion and uniaxial turning motion, a moment load having a function of inclining the pivot axis is applied to the pivot supporting mechanism. The moment load is applied through the guide rail to the pivot supporting mechanism so that the moment load is amplified by an amount corresponding to the length of the guide rail. Accordingly, a large displacement occurs at the pivot axis and the inclination angle of the table increases, thus leading to a poor positional determination.

SUMMARY OF THE INVENTION

An object of the present invention, which was made in order to solve the above-described problems, is therefore to provide a guide apparatus for biaxial shifting motion and uniaxial turning motion, which permits an easy operation control and an easy installation in a table and a proper guide and support of the table with high precision.

In order to attain the aforementioned object, a guide apparatus for biaxial shifting motion and uniaxial turning motion comprises a biaxial shifting motion guide mechanism for supporting a second member so as to be movable relative to a first member in a constant posture state along biaxial lines intersecting at right angles with each other; and a pivot supporting mechanism disposed on said biaxial shifting motion guide mechanism at an opposite side of said first member, for pivotably supporting said second member.

In the present invention, even when the second member is moved in parallel to a prescribed position and then is turned there, the biaxial lines in the biaxial shifting motion guide mechanism are invariable, thus making it possible to make an easy determination of an amount of displacement in each of the biaxial directions, which corresponds to the turning motion of the second member.

The biaxial lines in the biaxial shifting motion guide mechanism are invariable as mentioned above even after the turning motion of the second member, it is very easy to control of the parallel movement of the second member along the biaxial directions.

In the present invention, the pivot supporting mechanism may comprise a first ring and a second ring. The first ring is secured to the biaxial shifting motion guide mechanism and has a central axis, which is substantially identical with a line intersecting at right angles a plane defined by the biaxial lines. The second ring is coupled through a plurality of rolling members with the first ring so as to be rotatable relative thereto and is connected to the second member.

The biaxial shifting motion guide mechanism may comprise a first guide rail secured to the first member, a movable block connected through a plurality of rolling members to the first guide rail so as to be movable and a second guide rail connected through a plurality of rolling members to the movable block so as to be movable in a direction intersecting the first guide rail. The pivot supporting mechanism may comprise a first ring and a second ring. The first ring is secured to the second guide rail and the second ring is coupled through a plurality of rolling members with the first ring so as to be rotatable relative thereto and is secured to the second member.

In such an embodiment of the present invention, the first ring is secured to the second guide rail and the second ring is secured to the second member. Accordingly, the securing of the first ring to the second rail suffices, leading to an easy installation working.

The first guide rail and the second guide rail are connected to the single movable block, and parallelism between the bottom surfaces of the pair of guide rails can therefore be obtained by an easy machining process of the single movable block.

As a result, when there is obtained only a proper squareness of the pivot axis of the first ring relative to the second guide rail, a proper squareness of the bottom surface of the first guide rail relative to the pivot axis can automatically be obtained, and the parts of the guide apparatus can very easily be assembled under a precise positional determination condition.

Formation of only a hole, into which the second ring is to be fitted, on a table as the second member suffices, thus leading to an easy working process on the table. When force is applied to the table at a position apart from the pivot axis of the guide apparatus for biaxial shifting motion and uniaxial turning motion, a moment load having a function of inclining the pivot axis is applied to the pivot supporting mechanism. The moment load is however applied through the second ring to the pivot axis and a merely small displacement occurs at the pivot axis.

The apparatus of the present invention may further comprise a linear actuator secured to any one of the first member and the second member. The linear actuator is operatively connected to the movable block.

In such an embodiment of the present invention, pushing the movable block by means of the above-mentioned linear actuator permits relative movement of the movable block between the first member and the second member.

According to such an operative connection of the linear actuator with the movable block, it is unnecessary to form any specific connecting portions for the linear actuator on the first and second members.

It is preferable to use a screw feeding mechanism as the linear actuator. In this case, the movable block preferably has a nut portion, to which a feed screw of the above-mentioned screw feeding mechanism is screwed.

When the screw feeding mechanism is used, the non-turning condition of the feed screw permits to make a positional determination of the movable block in the axial direction of the feed screw.

It is preferable to provide the apparatus of the present invention with the following features:

(1) the first recess portion, into which the first guide rail is to be inserted slidably is formed on one side of the movable block;

(2) there are provided four roller running grooves so that the two roller running grooves of them are respectively formed on the upper and lower portions of each of the right and left-hand longitudinal side surfaces of the first guide rail, there are provided four roller running counter-grooves, which face the four roller running grooves, respectively, so that the two roller running counter-grooves of them are respectively formed on the upper and lower portions of each of the right and left-hand inner surfaces of the first recess portion, there are formed four rolling member returning passages on the movable block so as to be in parallel with the above-mentioned four roller running grooves, and there is provided on each of the longitudinal opposite ends of the movable block a side cover having direction changing passages for connecting the four roller running grooves with the four rolling member returning passages;

(3) in each of the right and left-hand longitudinal side surfaces of the first guide rail, a line connecting the contact points of the rolling member with the upper roller running groove and the upper roller running counter-groove facing thereon and the other line connecting the contact points of the rolling member with the lower roller running groove and the lower roller running counter-groove facing thereon symmetrically incline relative to a horizontal line locating between the upper two trains of rolling members and the lower two trains of rolling members;

(4) the second recess portion, into which the second guide rail is to be inserted slidably is formed on the other side of the movable block;

(5) there are provided four roller running grooves so that the two roller running grooves of them are respectively formed on the upper and lower portions of each of the right and left-hand longitudinal side surfaces of the second guide rail, and there are provided four roller running counter-grooves, which face the four roller running grooves, respectively, so that the two roller running counter-grooves of them are respectively formed on the upper and lower portions of each of the right and left-hand inner surfaces of the second recess portion, there are formed four rolling member returning passages on the movable block so as to be in parallel with the above-mentioned four roller running grooves, and there is provided on each of the longitudinal opposite ends of the movable block a side cover having direction changing passages for connecting the four roller running grooves with the four rolling member returning passages; and (6) in each of the right and left-hand longitudinal side surfaces of the second guide rail, a line connecting the contact points of the rolling member with the upper roller running groove and the upper roller running counter-groove facing thereon and the other line connecting the contact points of the rolling member with the lower roller running groove and the lower roller running counter-groove facing thereon symmetrically incline relative to a horizontal line locating between the upper two trains of rolling members and the lower two trains of rolling members.

According to such a structure in which the four trains of rolling members are disposed between the first recess portion of the movable block and the first guide rail and the similar four trains of rolling members are also disposed between the second recess portion of the movable block and the second guide rail, and in each of the right and left-hand longitudinal side surfaces of each of the first and second guide rails, the line connecting the contact points of the rolling member with the upper roller running groove and the upper roller running counter-groove facing thereon and the other line connecting the contact points of the rolling member with the lower roller running groove and the lower roller running counter-groove facing thereon symmetrically incline relative to the horizontal line locating between the upper two trains of rolling members and the lower two trains of rolling members, there can be obtained a supporting structure having a high rigidity against loads applied from any direction, such as compressive load in the axial direction of the pivot axis, tensile load in the axial direction of the pivot axis, load acting in a direction perpendicular to the pivot axis, moment load having a function of inclining the pivot axis and the like.

In the present invention, the biaxial shifting motion guide mechanism may comprise a first guide rail secured to the first member, a first movable block connected through a plurality of rolling members to the first guide rail so as to be movable, a second guide rail secured to the first movable block so as to intersect the first guide rail and a second movable block movably connected through a plurality of rolling members to the second guide rail; and the pivot supporting mechanism may comprise a first ring and a second ring. The first ring is secured to the second movable block and the second ring is coupled through a plurality of rolling members with the first ring so as to be rotatable relative thereto and is secured to the second member.

Also in such an embodiment of the present invention, the first ring is secured to the second guide rail and the second ring is secured to the second member. Accordingly, the securing of the first ring to the second rail suffices, leading to an easy installation working.

In the above-mentioned embodiment, the second guide rail is secured to the first movable block and the second movable block is slidably connected to the second guide rail. As a result, when there is obtained only a proper squareness in the contact surfaces of the first movable block and the second guide rail, which are secured to each other, and in the contact surfaces of the second movable block and the first guide rail, a proper squareness of the bottom surface of the first guide rail relative to the pivot axis can automatically be obtained, and the parts of the guide apparatus can very easily be assembled under a precise positional determination condition.

Formation of only a hole, into which the second ring is to be fitted, on a table as the second member suffices, thus leading to an easy working process on the table. When force is applied to the table at a position apart from the pivot axis of the guide apparatus for biaxial shifting motion and uniaxial turning motion, a moment load having a function of inclining the pivot axis is applied to the pivot supporting mechanism. The moment load is however applied through the second ring to the pivot axis and a merely small displacement occurs at the pivot axis.

In the present invention, the first guide rail may have a pair of supporting walls, between which the first movable block is held through the rolling members.

According to such a structure in which the first movable block is held between the pair of supporting walls of the first guide rail, stability can be improved.

It is preferable to dispose a linear actuator for moving the first movable block relative to the first guide rail, between the first guide rail and the first movable block.

When the linear actuator is disposed between the first guide rail and the first movable block as mentioned above, and the linear actuator is located in the central portion of the first movable block, the distance between the portion of the first movable block, to which force for moving the first movable block is imparted, and each of the trains of the rolling members located between the first guide rail and the first movable block can be decreased, with the result that moment load caused by the rolling resistance of the trains of the rolling members and the driving force for moving the first movable block does not have any adverse effects.

The above-mentioned linear actuator is preferably composed of a screw shaft, which is disposed so as to be in parallel with the supporting walls of the first guide rail and is screwed into a screw hole formed on the first movable block; a bearing member for rotatably supporting the screw shaft; and a driving mechanism for rotating the screw shaft.

According to such a structure, it is unnecessary to provide any specific linear driving mechanism between the base and the table.

It is also preferable to provide the apparatus of the present invention with the following features:
(1) there are provided four roller running grooves so that the two roller running grooves of them are respectively formed on the upper and lower portions of each of the right and left-hand supporting walls of the first guide rail, there are provided four roller running counter-grooves, which face the four roller running grooves, respectively, so that the two roller running counter-grooves of them are respectively formed on the upper and lower portions of each of the right and left-hand side surfaces of the first guide rail, there are formed four rolling member returning passages on the first movable block so as to be in parallel with the above-mentioned four roller running grooves, and there is provided on each of the longitudinal opposite ends of the movable block a side cover having direction changing passages for connecting the four roller running grooves with the four rolling member returning passages;
(2) the second recess portion, into which the second guide rail is to be inserted slidably is formed on the second movable block; and
(3) there are provided four roller running grooves so that the two roller running grooves of them are respectively formed on the upper and lower portions of each of the right and left-hand longitudinal side surfaces of the second guide rail, and there are provided four roller running counter-grooves, which face the four roller running grooves, respectively, so that the two roller running counter-grooves of them are respectively formed on the upper and lower portions of each of the right and left-hand inner surfaces of the second recess portion of the second movable block, there are formed four rolling member returning passages on the second movable block so as to be in parallel with the above-mentioned four roller running grooves, and there is provided on each of the longitudinal opposite ends of the second movable block a side cover having direction changing passages for connecting the four roller running grooves with the four rolling member returning passages.

When the four trains of rolling members are disposed between the first movable block and the supporting walls of the first guide rail and the similar four trains of rolling members are also disposed between the second guide rail and the inner side surfaces of the recess portion of the second movable block, and a line connecting the contact points of the rolling member with the upper roller running groove and the upper roller running counter-groove facing thereon and the other line connecting the contact points of the rolling member with the lower roller running groove and the lower roller running counter-groove facing thereon symmetrically incline relative to a horizontal line locating between the upper two trains of rolling members and the lower two trains of rolling members, then there can be obtained a supporting structure having a high rigidity against loads applied from any direction, such as compressive load in the axial direction of the pivot axis, tensile load in the axial direction of the pivot axis, load acting in a direction perpendicular to the pivot axis, moment load having a function of inclining the pivot axis and the like.

In the present invention, the second ring may be coupled through rollers as the rolling members with an outer periphery of the first ring; the first ring may have on an outer peripheral surface thereof a first groove, which opens outward in a radius direction of the first ring, the first groove is composed of an upper roller-running surface and a lower roller-running surface intersecting the upper roller-running surface substantially at right angles; the second ring may have on an inner peripheral surface thereof a second groove, which opens inward in a radius direction of the second ring so as to face the first groove, the second groove is composed of an upper roller-running surface and a lower roller-running surface intersecting the upper roller-running surface substantially at right angles; and a part of the rollers disposed between the first groove and the second groove may be rollable between the upper roller-running surface of the first ring and the lower roller-running surface of the second ring, and a remaining part of the rollers may be rollable between the lower roller-running surface of the first ring and the upper roller-running surface of the second ring.

According to such a structure in which the rollers are disposed between the first ring and the second ring, there can be obtained a supporting structure, which is composed of a pair of rings, i.e., the first ring and the second ring, and has a high rigidity against loads applied from any direction, such as compressive load in the axial direction of the pivot axis, tensile load in the axial direction of the pivot axis, load acting in a direction perpendicular to the pivot axis, moment load having a function of inclining the pivot axis and the like. As a result, there can be obtained the supporting structure, which is lightweight and has a high rigidity. In addition, such a supporting structure can be provided in a large-size.

Each of the above-mentioned part of the rollers disposed so as to be rollable between the upper roller-running surface of the first groove and the lower roller-running surface of the second groove, and each of the remaining part of the rollers disposed so as to be rollable between the lower roller-running surface of the first groove and the upper roller-running surface of the second groove may be arranged alternately.

It is preferable to provide a pre-load imparting means for imparting pre-load to the rollers disposed between the first groove and the second groove. The supporting structure having a further high rigidity can be obtained by imparting such pre-load to the rollers.

An apparatus for biaxial shifting motion and uniaxial turning motion of the present invention comprise (1) a base, (2) a table, (3) a biaxial shifting motion guide mechanism for supporting the table so as to be movable relative to the base in a constant posture state along biaxial lines intersecting at right angles with each other and (4) a pivot supporting mechanism disposed on the biaxial shifting motion guide mechanism at an opposite side of the base, for pivotably supporting the table.

In an embodiment of the above-described apparatus of the present invention, the biaxial shifting motion guide mechanism may comprise a first guide rail secured to the base, a movable block connected through a plurality of rolling members to the first guide rail so as to be movable and a second guide rail connected through a plurality of rolling members to the movable block so as to be movable in a direction intersecting the first guide rail, and the pivot supporting mechanism may comprise a first ring and a second ring. The first ring is secured to the second guide rail and the second ring is coupled through a plurality of rolling members with the first ring so as to be rotatable relative thereto and is secured to the table.

In the other embodiment of the above-mentioned apparatus of the present invention, the biaxial shifting motion guide mechanism may comprise a first guide rail secured to the base, a first movable block connected through a plurality of rolling members to the first guide rail so as to be movable, a second guide rail secured to the first movable block so as to intersect the first guide rail and a second movable block movably connected through a plurality of rolling members to the second guide rail, and the pivot supporting mechanism may comprise a first ring and a second ring. The first ring is secured to the second movable block and the second ring is coupled through a plurality of rolling members with the first ring so as to be rotatable relative thereto and is secured to the table.

In the above described embodiments of the present invention, the first guide rail of the biaxial shifting motion guide mechanism is secured to the base and the second ring of the pivot supporting mechanism is secured to the table. However, the second ring of the pivot supporting mechanism may be secured to the base and the first guide rail of the biaxial shifting motion guide mechanism may be secured to the table.

As the biaxial shifting motion guide mechanism, there may be used a plurality of biaxial shifting motion guide mechanisms disposed between the base and the table.

The plurality of biaxial shifting motion guide mechanisms can be disposed in any place. In case that the table having a rectangular shape is supported, the biaxial shifting motion guide mechanisms respectively disposed at the four corners of the table permit to prevent the four corners of the table from being deformed. There is available a structure in which a large vacancy is formed at the central portion of the table, and as a result, a working process of passing something through the vacancy can be carried out. Such a structure leads to decrease in weight of the apparatus.

A braking mechanism for maintaining the stationary condition of the table relative to the base may be provided between the table and the base. The braking mechanism may comprise a brake pad provided so as to be capable of coming into contact with any one of the table and the base or separating therefrom, a linear guide mechanism secured to the other of the table and the base, for guiding and supporting the brake pad, and a pressure mechanism for moving the brake pad toward the above-mentioned one of the table and the base and pressing the same against the above-mentioned one of them.

According to such a structure in which the brake pad is guided and supported by the linear guide mechanism, load given to the brake pad through the table can be born by means of the linear guide mechanism and is not applied to the pressure mechanism. Even when the pressure mechanism has no sufficient rigidity in the transverse direction, there occurs no variation in shifting position of the table, which may be caused by the deformation of the pressure mechanism.

BRIEF DESCRIPTION OF THE DRAWINGS

FIG. 4(a) is a plan view illustrating a table type working apparatus provided with the guide apparatus for biaxial shifting motion and uniaxial turning motion as shown in FIGS. 1(a) and 1(b), in which plan view a table is shown in two-dot chain lines, and FIG. 4(b) is a front view illustrating the table type working apparatus as shown in FIG. 4(a);

FIG. 7(a) is a front view having a partially sectioned portion, illustrating a guide apparatus for biaxial shifting motion and uniaxial turning motion of the second embodiment of the present invention, and FIG. 7(b) is a side view having a partially sectioned portion, illustrating the guide apparatus as shown in FIG. 7(a);

DETAILED DESCRIPTION OF THE PREFERRED EMBODIMENTS

Figure 1A:
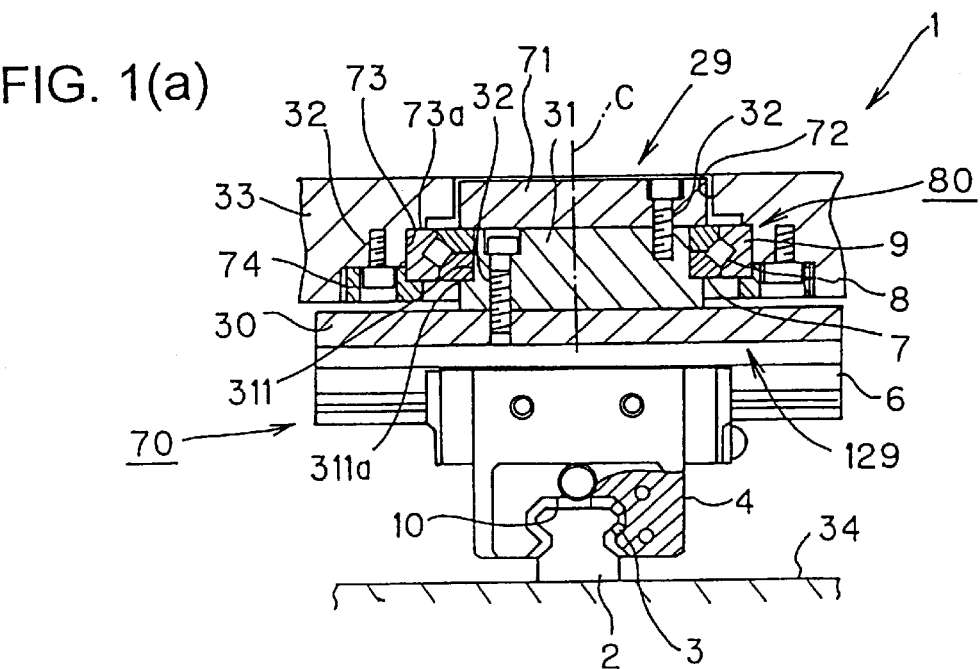
FIG. 1(a) is a plan view having a partially sectioned portion, illustrating a guide apparatus for biaxial shifting motion and uniaxial turning motion of the first embodiment of the present invention.
Figure 1B:
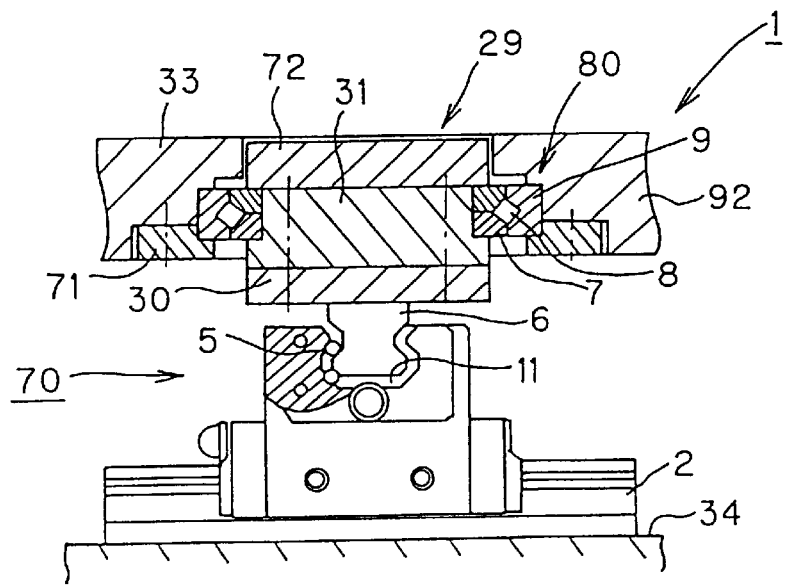
FIG. 1(b) is a side view having a partially sectioned portion, illustrating the guide apparatus as shown in FIG. 1(a)

Now, embodiments of a guide apparatus for biaxial shifting motion and uniaxial turning motion of the present invention will be described in detail below with reference to the accompanying drawings.

FIGS. 1(a) to 3(b) illustrate a guide apparatus 1 for biaxial motion and uniaxial turning motion of the first embodiment of the present invention.

In the first embodiment, the guide apparatus 1 is composed of a biaxial shifting motion guide mechanism 70 designed as an integral body and of a pivot supporting mechanism 80 combined with the biaxial shifting motion guide mechanism 70.

More specifically, the biaxial shifting motion guide mechanism 70 is composed of a first guide rail 2 secured to a base 34 designed as the first member, a movable block 4 connected through balls 3 designed as a plurality of rolling members to the first guide rail 2 so as to be movable and a second guide rail 6 connected through balls 5 designed as a plurality of rolling members to the movable block 4 so as to be movable in a direction intersecting the first guide rail 2.

The pivot supporting mechanism 80 is composed of a first ring 7 and a second ring 9. The first ring 7 is secured to the second guide rail 6. The second ring 9 is coupled through rollers 8 designed as a plurality of rolling members with the first ring 7 so as to be rotatable relative thereto. A table 33 designed as the second member is secured to the above-mentioned second ring 9.

The first ring 7 designed as an inner ring and the above-mentioned second guide rail 6 having a linear shape are connected with each other through a coupling portion 29.

The coupling portion 29 is provided with a first coupling plate 30 having a rectangular shape and a second coupling plate 31 having a disc-shape. The second guide rail 6 is secured to the first coupling plate 30. The first ring 7 is secured to the second coupling plate 31. The first coupling plate 30 and the second coupling plate 31 are connected to each other by means of a fastening member 32 such as a bolt and the like. The second coupling plate 31 has on its periphery a projection portion 311. The first ring 7 designed as the inner ring is fitted to the projection portion 311 from the upper side. A supporting member 71 is tightly secured to the upper surface of the projection portion 311 by means of the fastening member 32 such as a bolt and the like. The first ring 7 is designed to be held between the supporting member 71 and a shoulder portion 311a, which is located at the lower portion of the projection portion 311 so as to maintain the stationary condition of the first ring 7.

The table 33 to which the second ring 9 is to be secured has an opening 72 having a circular shape. The above-mentioned supporting member 71 of the first ring 7 is designed to be able to be inserted in the opening 72 from the upper side. A recess portion 73 is formed on the lower peripheral surface of the opening 72 of the table 33. The second ring 72 is fitted to the recess portion 73. A supporting member 74 for holding the second ring 9 is tightly secured to the peripheral edge of the recess portion 73 by means of the fastening member 32 such as a bolt and the like. The second ring 9 is designed to be held between the supporting member 74 and the peripheral edge 73a of the recess portion 73 so as to maintain the stationary condition of the second ring 9.

Figure 2A:
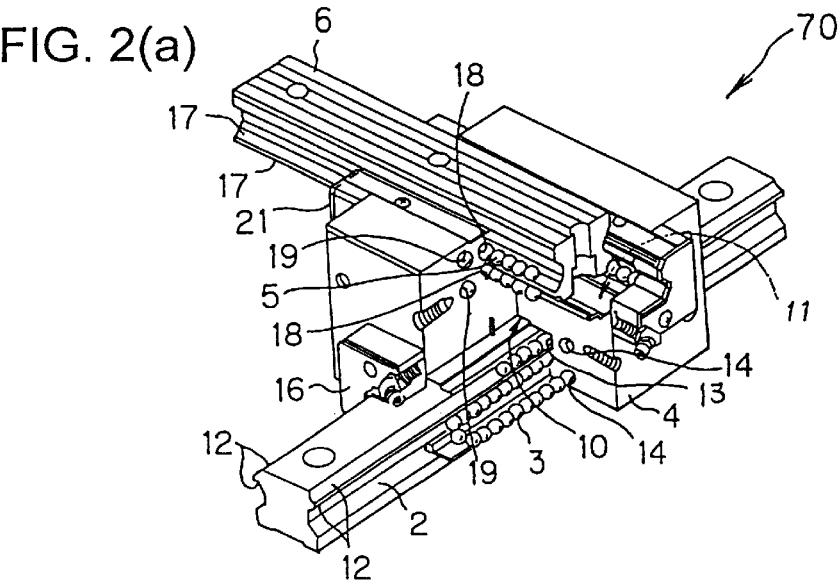
FIG. 2(a) is a perspective view having a partially sectioned portion, illustrating the guide apparatus as shown in FIGS. 1(a) and 1(b)
Figure 2B:
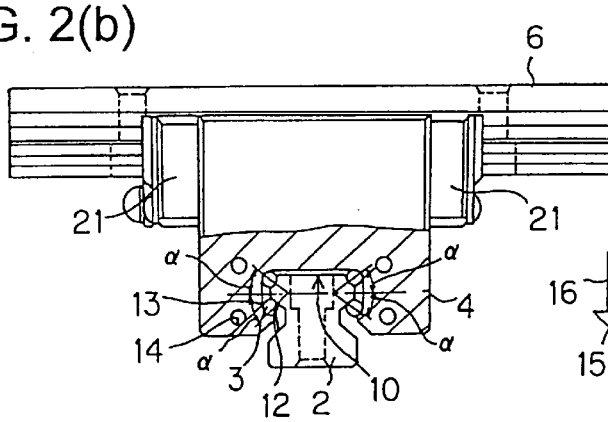
FIG. 2(b) is a view illustrating a biaxial shifting motion guide mechanism of the guide apparatus as shown in FIG. 2(a), which has the lower half sectioned portion thereof.
Figure 2C:
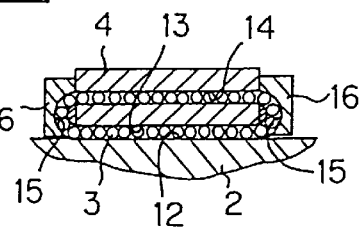
FIG. 2(c) is a sectional view illustrating the structure of a ball circulation passage of the guide apparatus as shown in FIG. 2(b)
Figure 2D:
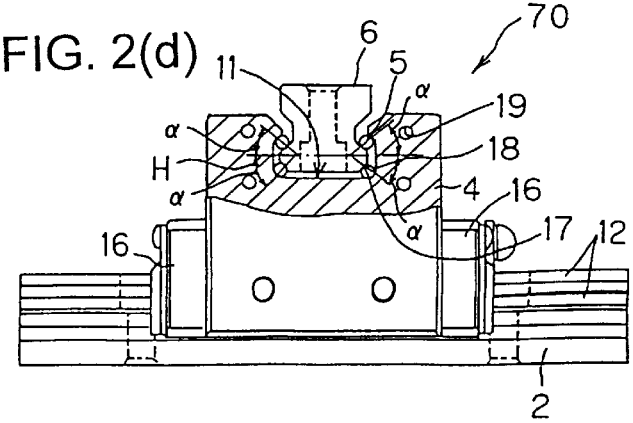
FIG. 2(d) is a view illustrating an X-Y guide mechanism of the guide apparatus as shown in FIG. 2(a), which has the upper half sectioned portion thereof.
Figure 2E:
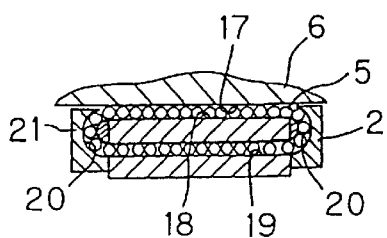
FIG. 2(e) is a sectional view illustrating the structure of a ball circulation passage of the guide apparatus as shown in FIG. 2(d)

A detailed description of the biaxial shifting motion guide mechanism 70 will be given below. The first guide rail 2, the movable block 4 and the second guide rail 6 compose, as shown in FIG. 2(a), a biaxial linear guide mechanism in which guiding directions cross each other at right angles. The movable block 4 has on its lower surface a first recess portion 10 having an inverse U-shaped cross section, in which the first guide rail 2 is to be inserted slidably. The movable block 4 has on its upper surface, i.e., the opposite surface to the first recess portion 10, a second recess portion 11 in which the second guide rail 6 is to be inserted slidably.

The first guide rail 2 is provided with four ball running grooves 12 so that the two ball running grooves 12 are formed on each of the right and left-hand surfaces of the first guide rail 2. On the other hand, the movable block 4 is provided with four ball running counter-grooves 13 so that the two ball running counter-grooves 13 are formed on each of the right and left-hand inner surfaces defining the first recess portion 10 of the movable block 4, which face the right and left-hand surfaces of the first guide rail 2. Accordingly, the four ball running grooves 12 of the first guide rail 2 face the four ball running counter-grooves 13 of the movable block 4, respectively.

The movable block 4 has four ball return passages 14, which are formed in parallel with each other on the lower half portion of the movable block 4. The four ball return passages 14 correspond to the four ball running counter-grooves 13 formed in the first recess portion 10 of the movable block 4, respectively. A side plate 16 is secured to each of the opposite end portions of the lower half portion of the movable block 4, which has the first recess portion 10. Each of the side plates 16 has four direction changing passages 15 for connecting the four ball running grooves 13 and the four ball return passages 14 of the movable block 4.

In each of the right and left-hand longitudinal side surfaces of the first guide rail 2, a line connecting the contact points of the ball 3 with the upper roller running groove 12 and the upper roller running counter-groove 13 facing thereon and the other line connecting the contact points of the ball 3 with the lower roller running groove 12 and the lower roller running counter-groove 13 facing thereon symmetrically incline at a prescribed angle a relative to a horizontal line locating between the upper two trains of balls 3 and the lower two trains of balls 3. In this embodiment, there is adopted a structure in which the line connecting the contact points of the ball 3 with the upper roller running groove 12 and the upper roller running counter-groove 13 facing thereon and the other line connecting the contact points of the ball 3 with the lower roller running groove 12 and the lower roller running counter-groove 13 facing thereon are close to each other at the inside of the first recess portion 10, on the one hand, and are apart from each other at the outside of the first recess portion 10, on the other hand. Pre-load is given to the balls 3. In the modification, there may of course be adopted a structure in which the line connecting the contact points of the ball 3 with the upper roller running groove 12 and the upper roller running counter-groove 13 facing thereon and the other line connecting the contact points of the ball 3 with the lower roller running groove 12 and the lower roller running counter-groove 13 facing thereon are apart from each other at the inside of the first recess portion 10.

The second guide rail 6 is also provided with four ball running grooves 17 so that the two ball running grooves 17 are formed on each of the right and left-hand surfaces of the second guide rail 6. On the other hand, the movable block 4 is provided with four ball running counter-grooves 18 so that the two ball running counter-grooves 18 are formed on each of the right and left-hand inner surfaces defining the second recess portion 11 of the movable block 4, which face the right and left-hand surfaces of the second guide rail 6. Accordingly, the four ball running grooves 17 of the second guide rail 6 face the four ball running counter-grooves 18 of the movable block 4, respectively.

Further, the movable block 4 has four ball return passages 19, which are formed in parallel with each other on the upper half portion of the movable block 4. The four ball return passages 19 correspond to the four ball running counter-grooves 18 formed in the second recess portion 11 of the movable block 4, respectively. A side plate 21 is secured to each of the opposite end portions of the upper half portion of the movable block 4, which has the second recess portion 11. Each of the side plates 21 has four direction changing passages 20 for connecting the four ball running grooves 18 and the four ball return passages 19 of the movable block 4.

In each of the right and left-hand longitudinal side surfaces of the second guide rail 6, a line connecting the contact points of the ball 5 with the upper roller running groove 17 and the upper roller running counter-groove 18 facing thereon and the other line connecting the contact points of the ball 5 with the lower roller running groove 17 and the lower roller running counter-groove 18 facing thereon symmetrically incline at a prescribed angle a relative to a horizontal line locating between the upper two trains of balls 5 and the lower two trains of balls 5. In this embodiment, there is adopted a structure in which the line connecting the contact points of the ball 5 with the upper roller running groove 17 and the upper roller running counter-groove 18 facing thereon and the other line connecting the contact points of the ball 5 with the lower roller running groove 17 and the lower roller running counter-groove 18 facing thereon are close to each other at the inside of the second recess portion 11, on the one hand, and are apart from each other at the outside of the second recess portion 11, on the other hand. In the modification, there may of course be adopted a structure in which the line connecting the contact points of the ball 5 with the upper roller running groove 17 and the upper roller running counter-groove 18 facing thereon and the other line connecting the contact points of the ball 5 with the lower roller running groove 17 and the lower roller running counter-groove 18 facing thereon are apart from each other at the inside of the second recess portion 11. Pre-load is given to the balls 5.

Figure 3A:
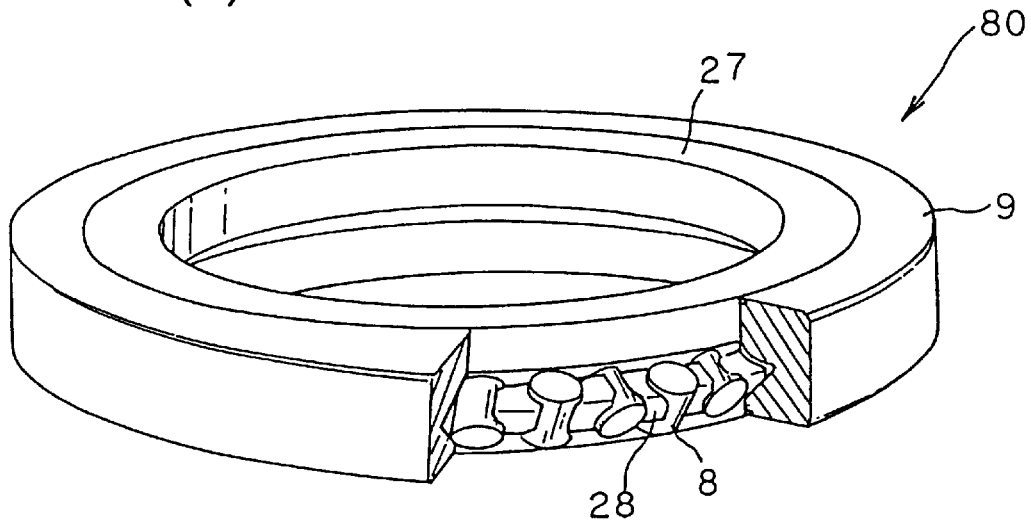
FIG. 3(a) is a perspective view having a partially sectioned portion, illustrating a pivot supporting mechanism of the guide apparatus as shown in FIGS. 1(a) and 1(b)
Figure 3B:
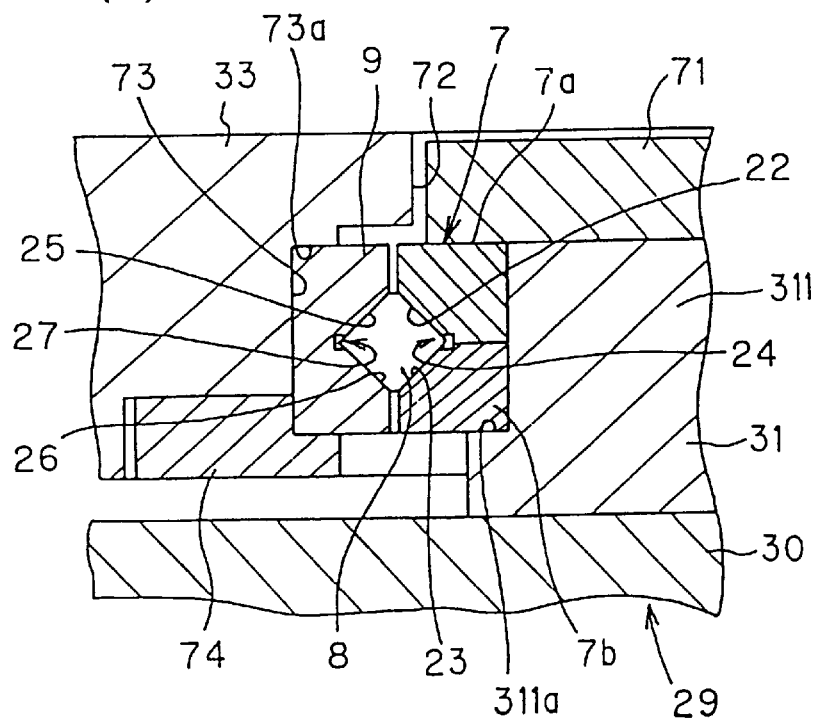
FIG. 3(b) is a partial sectional view of the pivot supporting mechanism as shown in FIG. 3(a)

Then, a detailed description of the pivot supporting mechanism 80 will be given below. As shown in FIGS. 3(a) and 3(b), the first and second rings 7, 9 are designed as inner and outer rings, which are arranged concentrically with each other, respectively. In this embodiment, the first ring 7 secured to the second guide rail 6 is used as the inner ring, and the second ring 9 is used as the outer ring. Rollers 8 are used as the rolling members in this embodiment.

The first ring 7 designed as the inner ring has on its outer peripheral surface a first groove 24, which opens outward in a radius direction of the first ring 7. The first groove 24 is composed of an upper roller-running surface 22 and a lower roller-running surface 23 intersecting the upper roller-running surface 22 substantially at right angles. The second ring 9 has on its inner peripheral surface a second groove 27, which opens inward in a radius direction of the second ring 9 so as to face the first groove 24. The second groove 27 is composed of an upper roller-running surface 25 and a lower roller-running surface 26 intersecting the upper roller-running surface 25 substantially at right angles.

A part of the rollers 8 disposed between the first groove 24 and the second groove 27 is rollable between the upper roller-running surface 22 of the first groove 24 and the lower roller-running surface 26 of the second groove 27. A remaining part of the rollers 8 is rollable between the lower roller-running surface 23 of the first groove 24 and the upper roller-running surface 25 of the second groove 27.

There is especially adopted a so-called "cross-roller type" structure in which each of the part of the rollers 8 disposed so as to be rollable between the upper roller-running surface 22 of the first groove 24 and the lower roller-running surface 26 of the second groove 27, and each of the remaining part of the rollers 8 disposed so as to be rollable between the lower roller-running surface 23 of the first groove 24 and the upper roller-running surface 25 of the second groove 27 are arranged alternately. A spacing retainer 28 is disposed between the adjacent two rollers 8.

In this embodiment, there is adopted a structure in which every other roller 8 has the same oriented central axis, which is perpendicular to an oriented axis of the other roller 8. There may be adopted a modified structure in which every two or three roller 8 has the same oriented central axis, which is perpendicular to an oriented axis of the other roller 8. Arrangement of the rollers 8 may optionally be modified in this manner.

Pre-load is given to the rollers 8 disposed between the first ring 7 and the second ring 9.

In this embodiment, the first ring 7 is divided into upper and lower half portions. When a gap is formed between the upper and lower half portions of the first ring 7, the rollers 8 can be brought into contact freely with the upper roller-running surface 22 and the lower roller-running surface 23 of the first groove 24. When the upper half portion of the first ring 7 is pressed against the lower half portion thereof so as to form no gap between them, each of the rollers 8 is pressed under a prescribed pressure, thus imparting pre-load to the rollers 8.

With respect to such a pre-load imparting mechanism, there may be used the second ring 9, which has a slit so that the second ring 9 can change its shape from a C-shape under a released condition into a circular shape under a restricted condition. When the second ring 9 having such a structure is fitted to the recess portion 73 of the table 33, the both ends of the second ring 9, which define the slit are brought into contact with each other so as to decrease the diameter of the second ring 9, thus imparting pre-load to the rollers 8.

According to such a structure, in which the rollers 8 are disposed between the first ring 7 and the second ring 9, there can be obtained a supporting structure, which is composed of the first ring 7 and the second ring 8, and has a high rigidity against loads applied from any direction, such as compressive load in the axial direction of the pivot axis C, tensile load in the axial direction of the pivot axis C, load acting in a direction perpendicular to the pivot axis C, moment load having a function of inclining the pivot axis C and the like. As a result, there can be obtained the supporting structure, which is lightweight and has a high rigidity.

Figure 5:
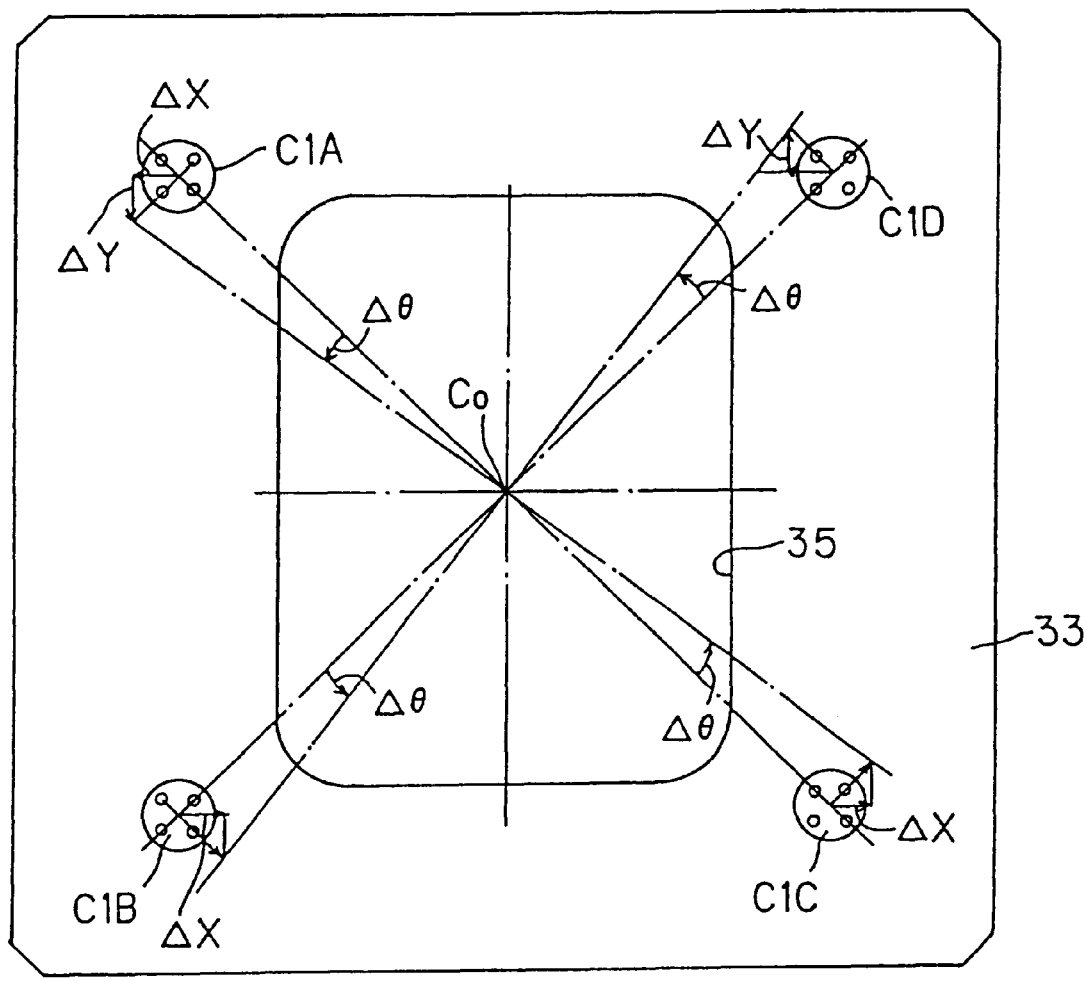
FIG. 5 is a plan view illustrating the table as shown in FIG. 4(a)
Figure 6A:
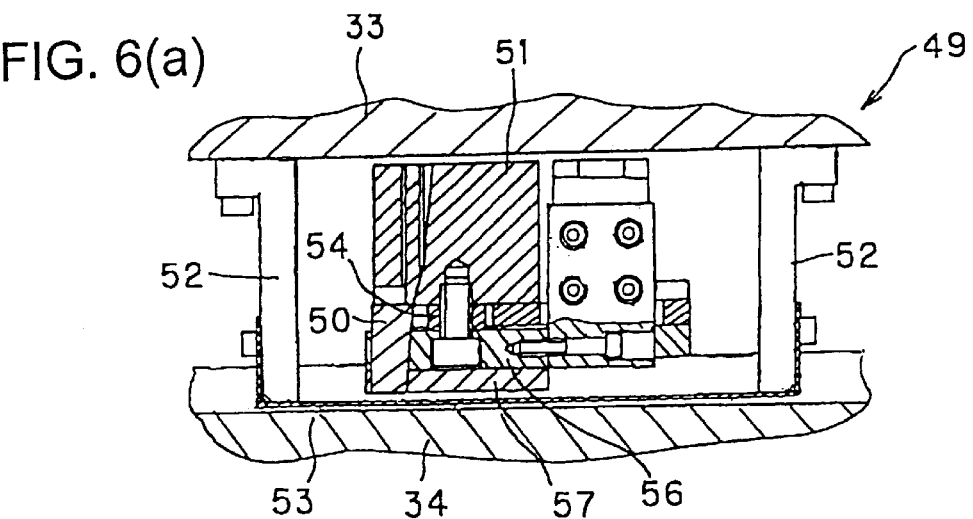
FIG. 6 is a view illustrating a braking mechanism of the table type working apparatus as shown in FIGS. 4(a) and 4(b)
Figure 6B:
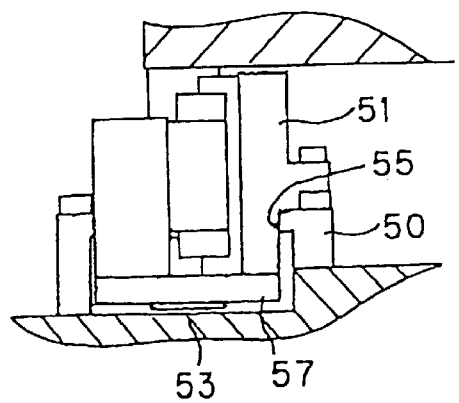
Figure 6C:
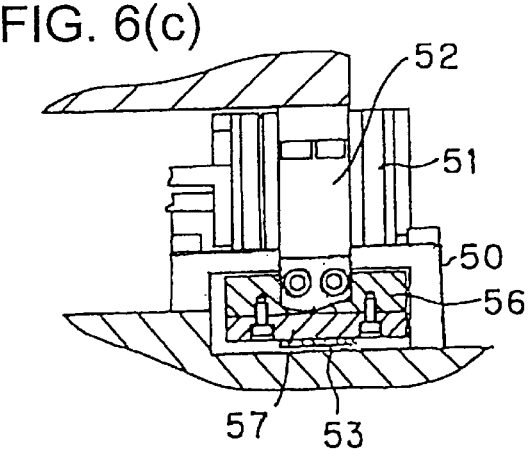
Figure 6D:
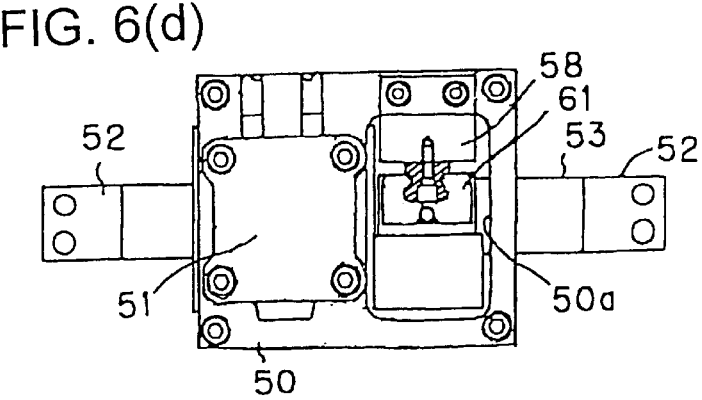

FIGS. 4(*a*) and 4(*b*) and FIG. 5 illustrate a table type working apparatus provided with the guide apparatus 1 for biaxial shifting motion and uniaxial turning motion of the first embodiment of the present invention.

In the above-mentioned table type working apparatus, a table 33 is supported through four guide apparatus 1A, 1B, 1C, 1D for biaxial shifting motion and uniaxial turning motion on a base 34 so as to be able to shift in biaxial directions intersecting at right angles with each other and to turn around a pivot axis Co located at the central portion of the table 33. The table 33 has an opening 35 formed at the central portion thereof. The base 34 has an opening 36 formed at the central portion thereof. The four guide apparatus 1A, 1B, 1C, 1D for biaxial shifting motion and uniaxial turning motion are disposed on the four corners so as to surround the openings 35, 36 and to maintain the condition that a first line connecting the centers of the guide apparatus 1A, 1C intersects a second line connecting the centers of the guide apparatus 1B, 1D at right angles. In case that the table 33 having a square shape is supported, arrangement of the four guide apparatus 1A, 1B, 1C, 1D at the four corners of the table 33 permits to prevent the four corners of the table 33 from being deformed. There is available a structure in which a large vacancy is formed at the central portion of the table 33, and as a result, a working process of passing something through the vacancy can be carried out. Such a structure leads to decrease in weight of the apparatus.

Here, the pivot axis Co, which locates at the central portion of the table 33 does not always coincide with the central axis O of the base 34. More specifically, the table 33 can be shifted in the biaxial directions relative to the base 34. When the center of the t able 33 i s shifted to a place other than the central axis O of the base 34, the pivot axis Co of the table 33 does not coincide with the central axis O of the base 34. The table 33 can be turned around the pivot axis Co at any position to which the table 33 can be shifted.

The four guide apparatus 1A, 1B, 1C, 1D for biaxial shifting motion and uniaxial turning motion are arranged so that the first line connecting the centers of the guide apparatus 1A, 1C intersects the second line connecting the centers of the guide apparatus 1B, 1D at right angles at the central axis O of the base 34. Accordingly, the guide apparatus 1A, 1C are located symmetrically relative to the second line and the guide apparatus 1B, 1D are also located symmetrically relative to the first line . Assumptions that one axis of the biaxial directions mentioned above is an X-axis in the lateral direction in FIG. 4(*a*) and the other axis of them is a Y-axis in the longitudinal direction in the same figure, cause the description given below to be simplified. With respect to the two guide apparatus 1A, 1B, which are disposed at the left-hand side of the Y-axis so as to be symmetrical relative to the X-axis, each of the first guide rails 2A, 2B secured to the base 34 is arranged in parallel with the X-axis, and each of the second guide rails 6A, 6B is arranged in parallel with the Y-axis.

With respect to the two guide apparatus 1C, 1D, which are disposed at the right-hand side of the Y-axis so as to be symmetrical relative to the X-axis, each of the first guide rails 2C, 2D secured to the base 34 is arranged in parallel with the Y-axis, and each of the second guide rails 6C, 6D is arranged in parallel with the X-axis.

Linear drive mechanisms 37A, 37B, 37D, which perform a linear expansion or contraction action, are operatively connected to three guide apparatus 1A, 1B, 1D of the above-described four guide apparatus 1A, 1B, 1C, 1D.

More specifically, the linear drive mechanisms 37A, 37B, which perform the linear action along the X-axis are respectively connected to the two guide apparatus 1A, 1B, which are disposed at the left-hand side of the Y-axis. The linear drive mechanism 37D, which performs the linear action along the Y-axis is connected to the guide apparatus 1D, which is disposed at the right-hand side of the Y-axis and the upper side of the X-axis. The guide apparatus 1C, which is disposed at the right-hand side of the Y-axis and the lower side of the X-axis, is designed to make a following motion.

The linear drive mechanisms 37A, 37B, 37D cause the movable blocks 4A, 4B, 4D of the guide apparatus 1A, 1B, 1D to move relative to the base 34. The linear drive mechanisms 37A, 37B, 37D have the respective first end portions secured to the base 34 and the respective second end portions operatively connected to the respective movable blocks 4A, 4B, 4D of the guide apparatus 1A, 1B, 1D. The movable blocks 4A, 4B, 4D are movable relative to the base 34, and the guide apparatus 1A, 1B, 1D are movable in the directions of the X-axis and the Y-axis along the first guide rail 2A, 2B, 2D secured to the base 34.

There may of course be adopted a modified structure in which the respective first end portions of the linear drive mechanisms 37A, 37B, 37D are secured to the table 33 so that the movable blocks 4A, 4B, 4D are movable relative to the table 33. In this case, the linear drive mechanisms 37A, 37B, 37D are designed to be movable in the directions parallel with the second guide rails 6A, 6B, 6D secured to the table 33.

All the linear drive mechanisms 37A, 37B, 37D have the same structure and are composed of a motor 38 and a screw feeding mechanism 39 for converting the rotational motion of the motor 38 into the linear motion. The screw feeding mechanism 39 is composed of a nut 41 connected through a bracket 40 to the movable block 4A, 4B, 4D, a screw shaft 42 engaged in the nut 41, a bearing 43 of the plural trains-angular contact type for rotatably supporting the screw shaft 42, and a bearing support member 44 for supporting the bearing 43. The motor 38 is secured through a bracket 45 on the base 34. The motor shaft 46 is connected through a coupling member 47 to the end of the screw shaft 42.

The above-mentioned linear drive mechanisms 37A, 3713, 37D may be connected between the base 34 and the table 33 so as to have no relation to the guide apparatus 1A, 1B, 1D.

Detecting mechanisms 48 for detecting a feeding amount are provided in the vicinity of the linear drive mechanisms 37A, 37B, 37D.

The two linear drive mechanisms 37A, 37B, which perform a linear motion in the X direction, are caused to be driven in synchronization with each other by the same amount of operation in order to shift the table 33 for example in the X direction. As a result, the movable blocks 4A, 4B of the two guide apparatus 1A, 1B shift in the X direction relative to the first guide rail 2A, 2B. The second guide rails 6C, 6D of the two guide apparatus 1C, 1D disposed at the right-hand side of the Y-axis accordingly shift in the X direction relative to the movable blocks 4C, 4D.

Drive of the linear drive mechanism 37D, which performs a liner motion in the Y direction, is carried out in order to shift the table 33 in the Y direction. As a result, the second guide rails 6A, 6B shift in the Y direction relative to the movable blocks 4A, 4B of the two guide apparatus 1A, 1B disposed at the left-hand side of the Y-axis. The movable blocks 4C, 4D of the two guide apparatus 1C, 1D disposed at the right-hand side of the Y-axis accordingly shift in the Y direction relative to the first guide rails 2C, 2D.

The combination of the synchronous drive of the two linear drive mechanisms 37A, 37B performing the linear motion in the X direction with the drive of the single linear drive mechanism 37D performing the linear motion in the Y direction permits the table 33 to be shifted in a constant posture state in the X and Y directions. The pivot axis Co of the table 33 simultaneously shifts in the X and Y directions.

The linear drive mechanism 37A performing the linear motion in the X direction is caused to be driven by a feeding amount of +ΔX, the linear drive mechanism 37B performing the linear motion in the X direction is caused to be driven in the opposite direction to the driving direction of the linear drive mechanism 37A by a feeding amount of −ΔX, and the linear drive mechanism 37D performing the linear motion in the Y direction is caused to be driven by a feeding amount of ΔY, in order to turn the table 33 around the pivot axis Co as shown in FIG. 5. As a result, the table 33 turns around the pivot axis Co by a prescribed angle of Δθ. The relationship among ΔX, ΔY and Δθ can geometrically be obtained and expressed by a formula. When the formula is previously stored in a controlling apparatus, the designation of a turning angle of the table 33 causes values of ΔX and ΔY as well as a value of turning number of each of the motors 38 to be calculated automatically so that the linear drive mechanisms 37A, 37B, 37D can be controlled on the basis of the thus calculated values.

Linear motors may be used to perform the direct drive in replacement of the screw feeding mechanism 39 as the linear drive mechanisms 37A, 37B, 37D. There may be used fluid-pressure type actuators instead, which utilizes hydraulic pressure such as oil pressure, or gas pressure such as air pressure.

The braking mechanism 49 designed as a braking means for maintaining the stationary condition of the table 33 relative to the base 34 is provided on each of two places between the table 33 and the base 34.

As shown in FIGS. 6(a) to 6(d), the braking mechanism 49 is provided with a cylinder 51, which is designed as a pressure mechanism secured to the base 34 through a cylinder-bracket 50 and utilizes the fluid pressure such as hydraulic pressure, i.e., oil pressure, etc., gas pressure, i.e., air pressure, etc., or the like, and a brake plate 53 secured to the table 33 through brake-brackets 52. The both ends of the brake plate 53 are fixed to the brake-brackets 52 through two fastening members such as bolts placed horizontally. As is clear from FIG. 6(d), the cylinder 51 is arranged above the brake plate 53.

The cylinder 51 is a gas-pressure type cylinder such as an air cylinder, which is fixed to the cylinder-bracket 50 by means of a fastening member such as a bolt. The cylinder-bracket 50 has a hole 55 in which a piston rod 54 extending downward from the cylinder 51 is to be inserted. A pad-bracket 56 is fixed to the forward end of the piston rod 54 passing through the above-mentioned hole 55, by means of fastening members such as bolts. A brake pad 57 is secured to the lower surface of the pad-bracket 56 by means of fastening members such as bolts so as to press the brake plate 53.

The cylinder-bracket 50 has a long hole 50a in which a portion of a rail-bracket 58 is inserted. The rail-bracket 58 is secured to the cylinder-bracket 50 by means of fastening members such as bolts placed vertically. A guide rail 60 of a linear motion guide mechanism 59 is secured to the rail-bracket 58 by means of two fastening members such as bolts placed horizontally. A block-bracket 62 is secured to a movable block 61 of the linear motion guide mechanism 59 by means of fastening members such as bolts. The linear motion guide mechanism 59 has a structure in which the movable block 61 is movably connected to the guide rail 60 through rolling members.

The block-bracket 62 is fixed to the pad-bracket 56 by means of two fastening members such as bolts placed horizontally, in a space covered with the cylinder-bracket 50. Accordingly, the upward or downward movement of the piston rod 54 of the cylinder 51 causes the movable block 61 of the linear motion guide mechanism 59 to move in the same direction.

The above-described braking mechanism 49 operates as follows.

When the piston rod 54 of the cylinder 51 is moved downward, the brake plate 53 is pressed down by means of the brake pad 57 secured to the forward end of the piston rod 54. The thus pressed brake plate 53, which is extremely thin, is deformed so as to be pressed against the base 34.

The brake plate 53 has a rectangular shape, whose long side is extremely longer than the short side thereof, and the brake-bracket 52 has a sufficient rigidity. There is almost no adverse influence on the upper surface of the table 33.

The cylinder 51 has a low rigidity against load acting in the lateral direction. A high rigidity can be ensured by means of the block-bracket 62 secured to the linear motion guide mechanism 59 in the vicinity of the cylinder 51 and by means of the pad-bracket 56 secured to the forward end of the piston rod 54 of the cylinder 51.

A linear actuator utilizing an electromagnetic force caused by a solenoid may be used in replacement of the above-described fluid-p-pressure type cylinder as the braking mechanism.

Any kind of mechanism having a function of bearing load in the lateral direction may be used as the linear motion guide mechanism 59. As the linear motion guide mechanism 59, there may be used a slide bearing as well as a linear bearing utilizing the guiding function of rolling members.

FIGS. 7(a) and 7(b) illustrate a guide apparatus 100 for biaxial motion and uniaxial turning motion of the second embodiment of the present invention.

The guide apparatus 100 for biaxial motion and uniaxial turning motion is composed of a first linear motion guide mechanism 170 acting in the single axial direction, a second linear motion guide mechanism 190, which is disposed above the first linear motion guide mechanism 170 and connected thereto so that the guide direction of the second linear motion guide mechanism 190 intersects the guide direction of the first linear motion guide mechanism 170 at right angles, and a pivot supporting mechanism 180, which is disposed above the second linear motion guide mechanism 190 and connected thereto.

More specifically, the first linear motion guide mechanism 170 is composed of a first guide rail 101 and a first movable block 103, which is movably connected to the first guide rail 101 through balls 102 designed as a plurality of rolling members.

The second linear motion guide mechanism 190 is composed of a second guide rail 104 secured to the first movable block 103 of the first linear motion guide mechanism 170 so as to intersect the first guide rail 101, and of a second movable block 106, which is connected to the second guide rail 104 through balls 105 designed as a plurality of rolling members so as to be movable along the second guide rail 104.

The pivot supporting mechanism 180 is composed of a first ring 107 secured to the second movable block 106 of the second linear motion guide mechanism 190, and of a second ring 109 coupled with the first ring 107 through rollers 108 designed as a plurality of rolling members so as to be turnable relative to the first ring 107.

The first ring 107 designed as the inner ring is connected to the above-mentioned second movable block 106 through a coupling portion 129.

The coupling portion 129 is provided with a first coupling plate 130 having a rectangular shape and a second coupling plate 131 having a disc-shape. The second movable block 106 is secured to the first coupling plate 130. The first ring 107 is secured to the second coupling plate 131. The first coupling plate 130 and the second coupling plate 131 are connected to each other by means of a fastening member 132 such as a bolt and the like. The second coupling plate 131 has on its periphery a projection portion 1311. The first ring 107 designed as the inner ring is fitted to the projection portion 1311 from the upper side. A supporting member 171 is tightly secured to the upper surface of the projection portion 1311 by means of the fastening member 132 such as a bolt and the like. The first ring 107 is designed to be held between the supporting member 171 and a shoulder portion 1311a, which is located at the lower portion of the projection portion 1311 so as to maintain the stationary condition of the first ring 107.

The table 133 to which the second ring 109 is to be secured has an opening 172 having a circular shape. The above-mentioned supporting member 171 of the first ring 107 is designed to be able to be inserted in the opening 172 from the upper side. A recess portion 173 is formed on the lower peripheral surface of the opening 172 of the table 133. The second ring 172 is fitted to the recess portion 173. A supporting member 174 for holding the second ring 109 is tightly secured to the peripheral edge of the recess portion 173 by means of the fastening member 132 such as a bolt and the like. The second ring 109 is designed to be held between the supporting member 174 and the peripheral edge 173a of the recess portion 173 so as to maintain the stationary condition of the second ring L09.

A detailed description of the first linear motion guide mechanism 170 will be given below.

Figure 8A:
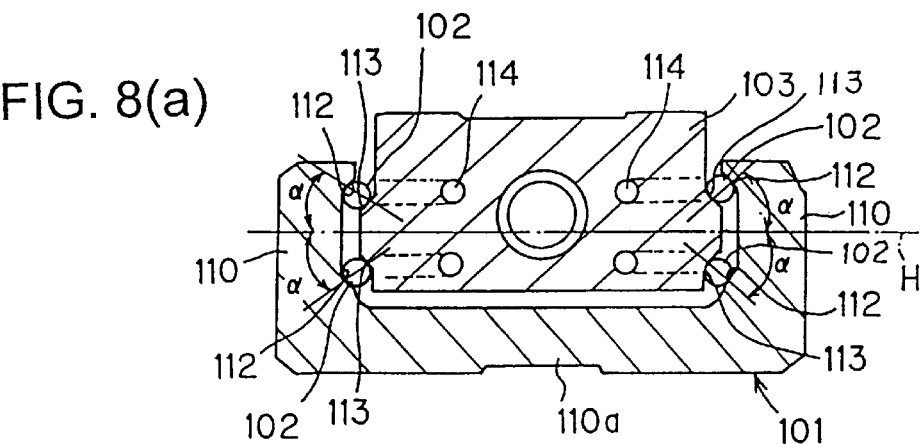
FIG. 8(a) is a sectional view illustrating the first guide rail and the first movable block as shown in FIGS. 7(a) and 7(b)
Figure 8B:
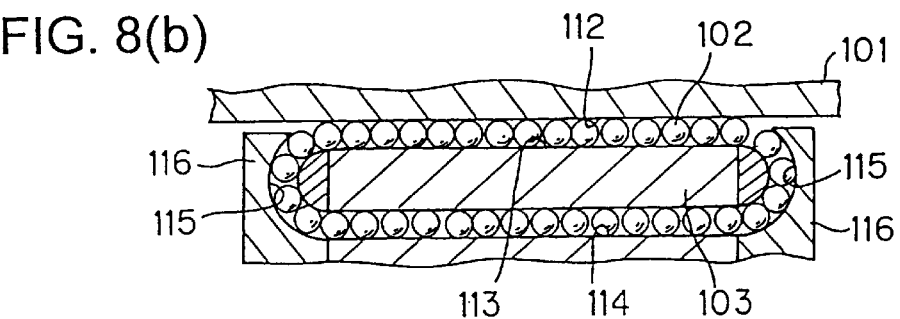
FIG. 8(b) is a sectional view illustrating a ball circulation passage as shown in FIG. 8(a)

As shown in FIGS. 8(a) and 8(b), the first guide rail 101 is designed as an integral formed body, which is composed of a pair of supporting wall portions 110, 110, between which the first movable block 103 is held and supported, and of a bottom wall portion 110a for connecting the supporting wall portions 110, 110. The first guide rail 101 is provided with four ball running grooves 112 so that the two ball running grooves 112 are formed on each of the inner surfaces of the supporting wall portions 110, 110. On the other hand, the first movable block 103 is provided with four ball running counter-grooves 113 so that the two ball running counter-grooves 113 are formed on each of the right and left-hand outer surfaces of the first movable block 103. Accordingly, the four ball running grooves 112 of the first guide rail 101 face the four ball running counter-grooves 113 of the first movable block 103, respectively.

The first movable block 103 has four ball return passages 114, which are formed in parallel with each other. The four ball return passages 114 correspond to the four ball running counter-grooves 113, respectively. A side plate 116 is secured to each of the opposite end portions of the first movable block 103. Each of the side plates 116 has four direction changing passages 115 for connecting the four ball running grooves 113 and the four ball return passages 114.

In each of the inner surfaces of the supporting wall portions 110, 110 of the first guide rail 101, a line connecting the contact points of the ball 102 with the upper roller running groove 112 and the upper roller running counter-groove 113 facing thereon and the other line connecting the contact points of the ball 102 with the lower roller running groove 112 and the lower roller running counter-groove 113 facing thereon symmetrically incline at a prescribed angle α relative to a horizontal line locating between the upper two trains of balls 102 and the lower two trains of balls 102. In this embodiment, there is adopted a structure in which the line connecting the contact points of the ball 102 with the upper roller running groove 112 and the upper roller running counter-groove 113 facing thereon and the other line connecting the contact points of the ball 102 with the lower roller running groove 112 and the lower roller running counter-groove 113 facing thereon are close to each other at the inside of the supporting wall portions 110, 110, on the one hand, and are apart from each other at the outside of the supporting wall portions 110, 110, on the other hand.

When the first linear motion guide mechanism 170 is coupled with a linear motion drive mechanism 200, there can be obtained a guide apparatus for biaxial shifting motion and uniaxial turning motion, provided with a driving mechanism.

More specifically, the first movable block 103 has in its central portion a screw hole 201, which extends in parallel with the lower roller running counter-grooves 113. A screw shaft 202 is engaged in the screw hole 201. It is preferable to dispose balls between the screw hole 201 and the screw shaft 202 so as to be rollable, to form a ball screw mechanism.

The both end portions of the screw shaft 202 are rotatably supported through bearings 204 on bearing supports 203 fixed to the first guide rail 101. The one end of the screw shaft 202 is connected through a coupling member 205 to an output shaft 207 of a motor 206 fixed to the first guide rail 101.

A detailed description of the second linear motion guide mechanism 190 will be given below.

Figure 8C:
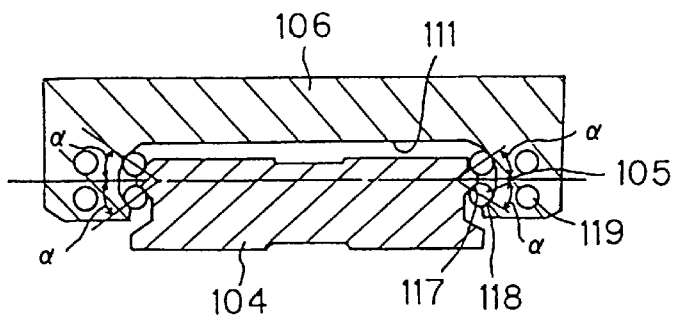
FIG. 8(c) is a sectional view illustrating the second guide rail and the second movable block as shown in FIGS. 7(a) and 7(b)
Figure 8D:
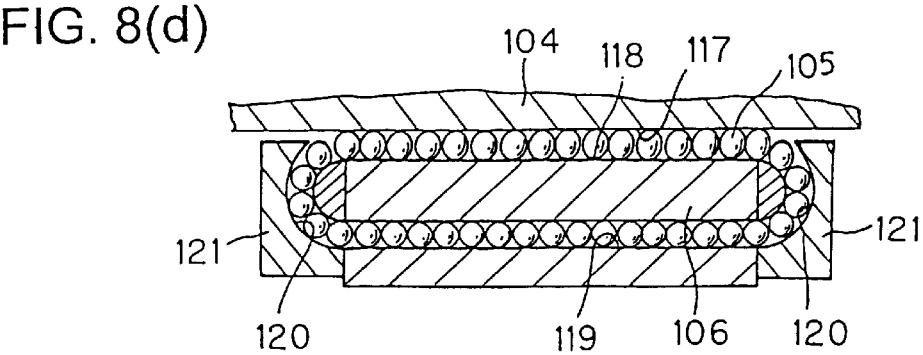
FIG. 8(d) is a sectional view illustrating a ball circulation passage as shown in FIG. 8(c)

As shown in FIGS. 8(c) and 8(d), the second movable block 106 has on its lower surface a second recess portion 111 in which the second guide rail 104 secured on the first movable block 103 is movably inserted.

The second guide rail 104 is also provided with four ball running grooves 117 so that the two ball running grooves 117 are formed on each of the right and left-hand side surfaces of the second guide rail 104. On the other hand, the second movable block 106 is provided with four ball running counter-grooves 118 so that the two ball running counter-grooves 118 are formed on each of the right and left-hand inner surfaces of the second recess portion 1 1 1 of the second movable block 106. Accordingly, the four ball running grooves 117 of the second guide rail 104 face the four ball running counter-grooves 118 of the second movable block 106, respectively.

The second movable block 106 has four ball return passages 119, which are formed in parallel with each other. The four ball return passages 119 correspond to the four ball running counter-grooves 118 of the second recess portion 111, respectively. A side plate 121 is secured to each of the opposite end portions of the second movable block 106. Each of the side plates 121 has four direction changing passages 120 for connecting the four ball running counter-grooves 118 and the four ball return passages 119.

In each of the right and left-hand longitudinal side surfaces of the second guide rail 104, a line connecting the contact points of the ball 105 with the upper roller running groove 117 and the upper roller running counter-groove 118 facing thereon and the other line connecting the contact points of the ball 105 with the lower roller running groove 117 and the lower roller running counter-groove 118 facing thereon symmetrically incline at a prescribed angle α relative to a horizontal line locating between the upper two trains of balls 105 and the lower two trains of balls 105. In this embodiment, there is adopted a structure in which the line connecting the contact points of the ball 105 with the upper roller running groove 117 and the upper roller running counter-groove 118 facing thereon and the other line connecting the contact points of the ball 105 with the lower roller running groove 117 and the lower roller running counter-groove 118 facing thereon are close to each other at the inside of the second recess portion 111, on the one hand, and are apart from each other at the outside of the second recess portion 111, on the other hand.

A detailed description of the pivot supporting mechanism 180 will be given below.

Figure 9A:
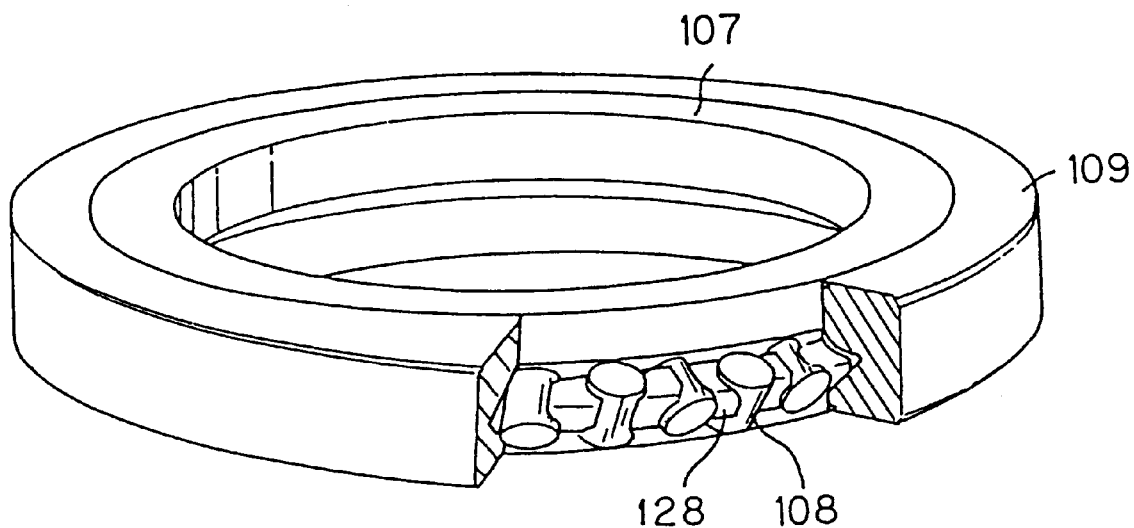
FIG. 9(a) is a perspective view having a partially sectioned portion, illustrating a pivot supporting mechanism of the guide apparatus as shown in FIGS. 7(a) and 7(b)
Figure 9B:
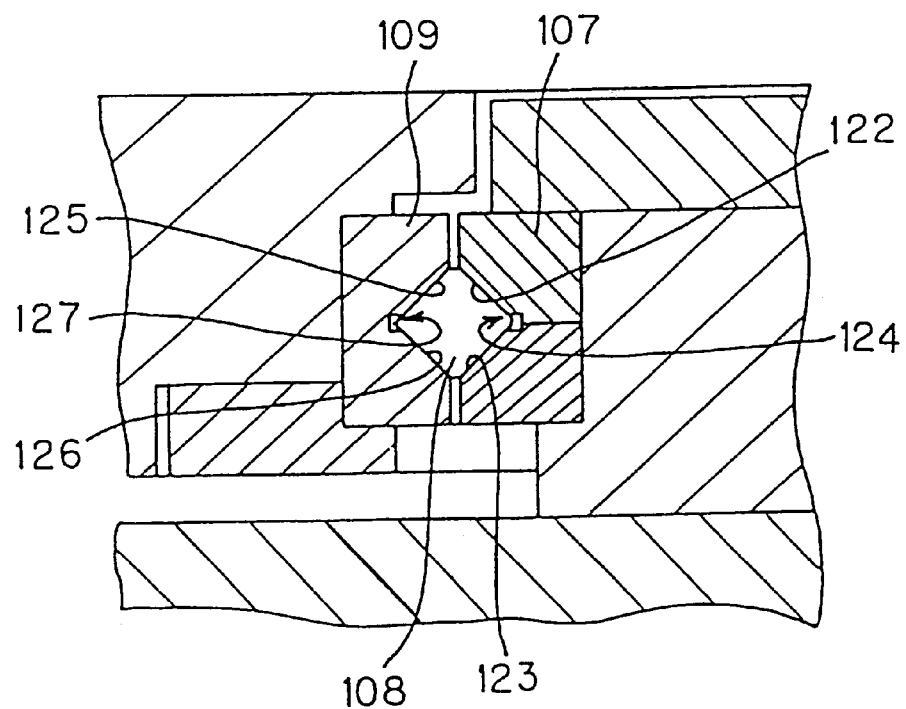
FIG. 9(b) is a partial sectional view of the pivot supporting mechanism as shown in FIG. 9(a)

As shown in FIGS. 9(a) and 9(b), the first and second rings 107, 109 are designed as inner and outer rings, which are arranged concentrically with each other, respectively. In this embodiment, the first ring 107 secured to the second guide rail 104 is used as the inner ring, and the second ring 109 is used as the outer ring. Rollers 108 are used as the rolling members in this embodiment.

The first ring 107 designed as the inner ring is connected to the above-mentioned second movable block 106 through a coupling portion 129.

The first ring 107 designed as the inner ring has on its outer peripheral surface a first groove 124, which opens outward in a radius direction of the first ring 107. The first groove 124 is composed of an upper roller-running surface 122 and a lower roller-running surface 123 intersecting the upper roller-running surface 122 substantially at right angles. The second ring 109 has on its inner peripheral surface a second groove 127, which opens inward in a radius direction of the second ring 109 so as to face the first groove 124. The second groove 127 is composed of an upper roller-running surface 125 and a lower roller-running surface 126 intersecting the upper roller-running surface 125 substantially at right angles.

A part of the rollers 108 disposed between the first groove 124 and the second groove 127 is rollable between the upper roller-running surface 122 of the first groove 124 and the lower roller-running surface 126 of the second groove 127. A remaining part of the rollers 108 is rollable between the lower roller-running surface 123 of the first groove 124 and the upper roller-running surface 125 of the second groove 127.

There is especially adopted a so-called "cross-roller type" structure in which each of the part of the rollers 108 disposed so as to be rollable between the upper roller-running surface 122 of the first groove 124 and the lower roller-running surface 126 of the second groove 127, and each of the remaining part of the rollers 108 disposed so as to be rollable between the lower roller-running surface 123 of the first groove 124 and the upper roller-running surface 125 of the second groove 127 are arranged alternately. A spacing retainer 128 is disposed between the adjacent two rollers 108.

In this embodiment, there is adopted a structure in which every other roller 108 has the same oriented central axis, which is perpendicular to an oriented axis of the other roller 108. There may be adopted a modified structure in which every two or three roller 108 has the same oriented central axis, which is perpendicular to an oriented axis of the other roller 108. Arrangement of the rollers 8 may optionally be modified in this manner.

Pre-load is given to the rollers 8 disposed between the first ring 107 and the second ring 109.

In this embodiment, the first ring 107 is divided into upper and lower half portions. When a gap is formed between the upper and lower half portions of the first ring 107, the rollers 108 can be brought into contact freely with the upper roller-running surface 122 and the lower roller-running surface 123 of the first groove 124. When the upper half portion of the first ring 107 is pressed against the lower half portion thereof so as to form no gap between them, each of the rollers 108 is pressed under a prescribed pressure, thus imparting pre-load to the rollers 108.

With respect to such a pre-load imparting mechanism, there may be used the second ring 109, which has a slit so that the second ring 109 can change its shape from a C-shape under a released condition into a circular shape under a restricted condition. When the second ring 109 having such a structure is fitted to the recess portion 173 of the table 133, the both ends of the second ring 109, which define the slit are brought into contact with each other so as to decrease the diameter of the second ring 109, thus imparting pre-load to the rollers 108.

According to such a structure, in which the rollers 108 are disposed between the first ring 107 and the second ring 109, there can be obtained a supporting structure, which is composed of the first ring 107 and the second ring 108, and has a high rigidity against loads applied from any direction, such as compressive load in the axial direction of the pivot axis C, tensile load in the axial direction of the pivot axis C, load acting in a direction perpendicular to the pivot axis C, moment load having a function of inclining the pivot axis C and the like. As a result, there can be obtained the supporting structure, which is lightweight and has a high rigidity.

Figure 10A:
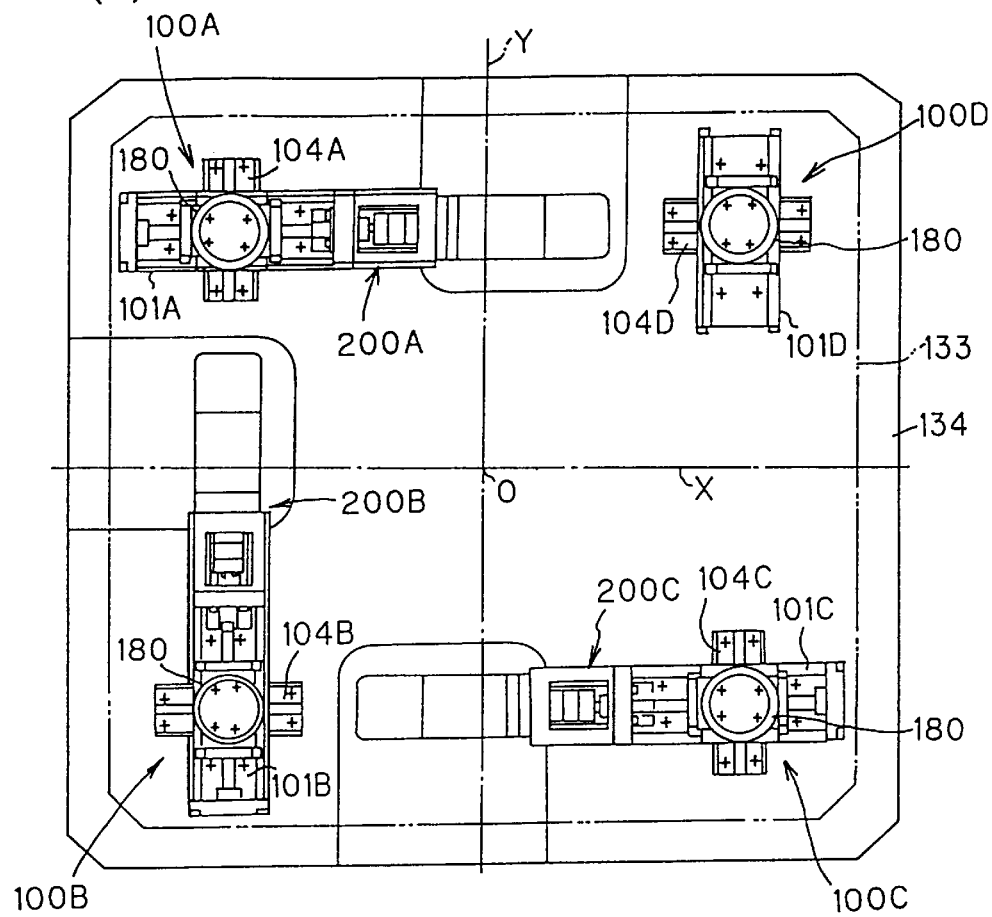
FIG. 10(a) is a plan view illustrating a table type working apparatus provided with the guide apparatus for biaxial shifting motion and uniaxial turning motion as shown in FIGS. 7(a) and 7(b), in which plan view a table is shown in two-dot chain lines.
Figure 10B:
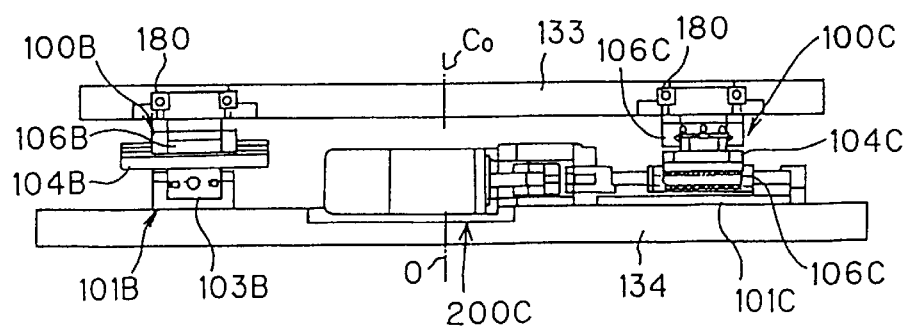
FIG. 10(b) is a front view illustrating the table type working apparatus as shown in FIG. 10(a)
Figure 11:
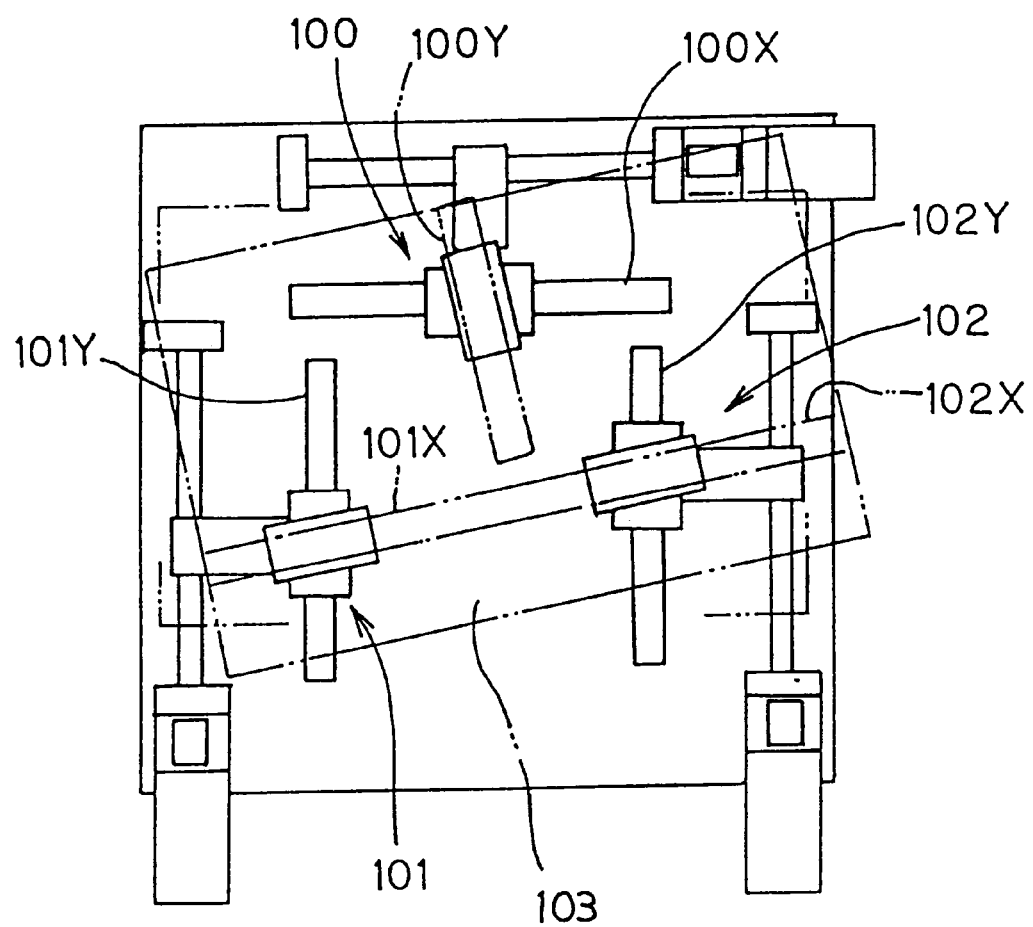
FIG. 11 descriptive view illustrating the operation of a conventional table type working apparatus provided with a conventional guide apparatus for biaxial shifting motion and uniaxial turning motion.

FIGS. 10(a) and 10(b) illustrate a table type working apparatus provided with the guide apparatus 100 for biaxial shifting motion and uniaxial turning motion of the second embodiment of the present invention.

In the above-mentioned table type working apparatus, a table 133 is supported through four guide apparatus 100A, 100B, 100C, 100D for biaxial shifting motion and uniaxial turning motion on a base 134 so as to be able to shift in biaxial directions intersecting at right angles with each other and to turn around a pivot axis Co located at the central portion of the table 133.

Here, the pivot axis Co, which locates at the central portion of the table 133 does not always coincide with the central axis O of the base 134. More specifically, the table 133 can be shifted in the biaxial directions relative to the base 134. When the center of the table 133 is shifted to a place other than the central axis O of the base 134, the pivot axis Co of the table 133 does not coincide with the central axis O of the base 134. The table 133 can be turned around the pivot axis Co at any position to which the table 133 can be shifted.

The four guide apparatus 100A, 100B, 100C, 100D for biaxial shifting motion and uniaxial turning motion are arranged so that the first line connecting the centers of the guide apparatus 100A 100C intersects the second line connecting the center s of the guide apparatus 100B, 100D at right angles at the central axis O of the base 134. Accordingly, the guide apparatus 1A, 1C are located symmetrically relative to the central axis O of the base 134 and the guide apparatus 1B, 1D are e also located symmetrically relative to the above-mentioned central axis O.

Assumptions that one axis of the biaxial directions mentioned above is an X-axis in the lateral direction in FIG. 10(a) and the other axis of them is a Y-axis in the longitudinal direction in the same figure, cause the description given below to be simplified. With respect to the guide apparatus 100A, which is disposed at the left-hand side of the Y-axis as well as at the upper side of the X-axis and the guide apparatus 100C, which is disposed at the right-hand side of the Y-axis as well as at the lower s side of the X-axis, each of the first guide rails 101A, 101C secured to the base 134 is a arranged in parallel with the X-axis , and each of the second guide rails 104A, 104B is arranged in parallel with the Y-axis.

With respect to the guide apparatus 100B, which is disposed at the left-hand side of the Y-axis a s well as at the lower side of the X-axis and the guide apparatus 100D, which is disposed at the right-hand side of the Y-axis as well as at the upper side of the X-axis, each of the first guide rails 110B, 101D secured to the base 134 is arranged in parallel with the Y-axis, and each of the second guide rails 104B, 104D is arranged in parallel with the X-axis.

Linear drive mechanisms 200A, 200B, 200C, which perform a linear expansion or contraction action, are operatively connected to three guide apparatus 100A, 100B, 100C of the above-described four guide apparatus 100A, 100B, 100C, 100D.

The two linear drive mechanisms 200A, 200C, which perform a linear motion in the X direction, are caused to be driven in synchronization with each other by the same amount of operation in order to shift the table 133 for example in the X direction. As a result, the second movable blocks 106B, 106D of the guide apparatus 100B, 100D shift in the X direction along the second guide rails 104B, 104D.

Drive of the linear drive mechanism 200B, which performs a linear motion in the Y direction, is carried out in order to shift the table 133 in the Y direction. As a result, the second movable blocks 106A, 106C of the guide apparatus 100A, 100C shift in the Y direction along the second guide rails 104A, 104C.

The combination of the synchronous drive of the two linear drive mechanisms 200A, 200C performing the linear motion in the X direction with the drive of the single linear drive mechanism 200B performing the linear motion in the Y direction permits the table 133 to be shifted in a constant posture state in the X and Y directions. The pivot axis Co of the table 133 simultaneously shifts in the X and Y directions.

The linear drive mechanism 200A performing the linear motion in the X direction is caused to be driven by a feeding amount of +ΔX, the linear drive mechanism 200B performing the linear motion in the X direction is caused to be driven in the opposite direction to the driving direction of the linear drive mechanism 200A by a feeding amount of −ΔX, and the linear drive mechanism 200B performing the linear motion in the Y direction is caused to be driven by a feeding amount of ΔY, in order to turn the table 133 around the pivot axis Co. As a result, the table 133 turns around the pivot axis Co by a prescribed angle of Δθ. The relationship among ΔX, ΔY and Δθ can geometrically be obtained and expressed by a formula. When the formula is previously stored in a controlling apparatus, the designation of a turning angle of the table 33 causes values of ΔX and ΔY as well as a value of turning number of each of the motors to be calculated automatically so that the linear drive mechanisms 200A, 200B, 200C can be controlled on the basis of the thus calculated values.

Linear motors may be used to perform the direct drive in replacement of the screw feeding mechanism 39 as the linear drive mechanisms 200A, 200B, 200D. There may be used fluid-pressure type actuators instead, which utilizes hydraulic pressure such as oil pressure, or gas pressure such as air pressure.

Needless to say, there may be provided the same braking mechanism as in the first embodiment of the present invention, for maintaining the stationary condition of the table 133 relative to the base 134. The description of the braking mechanism will be omitted.

In the biaxial shifting motion guide mechanism of the guide apparatus according to the first embodiment of the present invention, the movable block has on its opposite surfaces the first and second recess portions, respectively, extending directions of which intersect with each other at right angles, and the first and second guide rails are inserted through the rolling members in the first and second recess portions, respectively, so as to perform a linear motion. In the biaxial shifting motion guide mechanism of the guide apparatus according to the second embodiment of the present invention, the first movable block is supported through the rolling members between the right and left-hand supporting walls of the first guide rail so as to perform a linear motion, the second guide rail is secured to the above-mentioned first movable block so that the extending directions of the first and second guide rails intersect with each other at right angles, and the second movable block is connected through the rolling members to the second guide rail so as to perform a linear motion. The structure of the biaxial shifting motion guide mechanism is not limited only to that of these embodiments. More specifically, there may be adopted any kind of structure, which permits to support the second member so as to be movable relative to the first member in a constant posture state along the biaxial lines intersecting at right angles with each other.

According to the present invention as described in detail, the second member can be supported so as to be movable relative to the first member in the constant posture state along the biaxial directions intersecting at right angles with each other. Even when the second member is moved in parallel to a prescribed position and then is turned there, the biaxial lines in the biaxial shifting motion guide mechanism are invariable, thus making it possible to make an easy determination of an amount of displacement in each of the biaxial directions, which corresponds to the turning motion of the second member.

The biaxial lines in the biaxial shifting motion guide mechanism are invariable as mentioned above even after the turning motion of the second member, it is very easy to control of the parallel movement: of the second member along the biaxial directions.

When there is adopted a structure in which the first ring is secured to the second guide rail and the second ring is secured to the second member, the securing of the first ring to the second rail suffices, leading to an easy installation working.

When there is adopted a structure in which the first guide rail and the second guide rail are connected to the single movable block, parallelism between the bottom surfaces of the pair of guide rails can therefore be obtained by an easy machining process of the single movable block. As a result, when there is obtained only a proper squareness of the pivot axis of the first ring relative to the second guide rail, a proper squareness of the bottom surface of the first guide rail relative to the pivot axis can automatically be obtained, and the parts of the guide apparatus can very easily be assembled under a precise positional determination condition.

Formation of only a hole, into which the second ring is to be fitted, on a table as the second member suffices, thus leading to an easy working process on the table. When force is applied to the table at a position apart from the pivot axis of the guide apparatus for biaxial shifting motion and uniaxial turning motion, a moment load having a function of inclining the pivot axis is applied to the pivot supporting mechanism. The moment load is however applied through the second ring to the pivot axis and a merely small displacement occurs at the pivot axis.

When there is adopted a structure in which a linear actuator secured to any one of the first member and the second member is operatively connected to the movable block, relative movement of the movable block between the first member and the second member is permitted by pushing the movable block by means of the above-mentioned linear actuator and it is unnecessary to form any specific connecting portions for the linear actuator on the first and second members.

In case that there is adopted a structure in which the second guide rail is secured to the first movable block and the second movable block is slidably connected to the second guide rail, when there is obtained only a proper squareness in the contact surfaces of the first movable block and the second guide rail, which are secured to each other, and in the contact surfaces of the second movable block and the first guide rail, a proper squareness of the bottom surface of the first guide rail relative to the pivot axis can automatically be obtained, and the parts of the guide apparatus can very easily be assembled under a precise positional determination condition.

When there is adopted a structure in which the first guide rail has a pair of supporting walls, between which the first movable block is held through the rolling members, stability can be improved.

When the linear actuator is disposed between the first guide rail and the first movable block, and the linear actuator is located in the central portion of the first movable block, the distance between the portion of the first movable block, to which force for moving the first movable block is imparted, and each of the trains of the rolling members located between the first guide rail and the first movable block can be decreased, with the result that moment load caused by the rolling resistance of the trains of the rolling members and the driving force for moving the first movable block does not have any adverse effects.

When there is adopted a structure in which the rollers are disposed between the first ring and the second ring, there can be obtained a supporting structure, which is composed of a pair of rings, i.e., the first ring and the second ring, and has a high rigidity against loads applied from any direction, such as compressive load in the axial direction of the pivot axis, tensile load in the axial direction of the pivot axis, load acting in a direction perpendicular to the pivot axis, moment load having a function of inclining the pivot axis and the like. As a result, there can be obtained the supporting structure, which is lightweight and has a high rigidity. In addition, such a supporting structure can be provided in a large-size.

When there is adopted a structure in which the table is supported by means of a plurality of biaxial shifting motion guide mechanisms, the plurality of biaxial shifting motion guide mechanisms can be disposed in any place. In case that the table having a rectangular shape is supported, the biaxial shifting motion guide mechanisms respectively disposed at the four corners of the table permit to prevent the four corners of the table from being deformed. There is available a structure in which a large vacancy is formed at the central portion of the table, and as a result, a working process of passing something through the vacancy can be carried out. Such a structure leads to decrease in weight of the apparatus.

What is claimed is:

1. A guide apparatus for biaxial shifting motion and uniaxial turning motion, which comprises:

a biaxial shifting motion guide mechanism for supporting a second member so as to be movable relative to a first member in a constant posture state along biaxial lines intersecting at right angles with each other; and a pivot supporting mechanism disposed on said biaxial shifting motion guide mechanism at an opposite side of said first member, for pivotably supporting said second member, wherein:

said biaxial shifting motion guide mechanism comprises a first guide rail secured to said first member, a movable block connected through a plurality of rolling members to said first guide rail so as to be movable and a second guide rail connected through a plurality of rolling members to said movable block so as to be movable in a direction intersecting said first guide rail; and said pivot supporting mechanism comprises a first ring and a second ring, said first ring being secured to said second guide rail and said second ring being coupled through a plurality of rolling members with said first ring so as to be rotatable relative thereto and being secured to said second member.

2. The apparatus as claimed in claim 1, further comprises:

a linear actuator secured to any one of said first member and said second member, said linear actuator being operatively connected to said movable block.

3. A guide apparatus for biaxial shifting motion and uniaxial turning motion, which comprises:

a biaxial shifting motion guide mechanism for supporting a second member so as to be movable relative to a first member in a constant posture state along biaxial lines intersecting at right angles with each other; and a pivot supporting mechanism disposed on said biaxial shifting motion guide mechanism at an opposite side of said first member, for pivotably supporting said second member, wherein:

said biaxial shifting motion guide mechanism comprises a first guide rail secured to said first member, a first movable block connected through a plurality of rolling members to said first guide rail so as to be movable, a second guide rail secured to said first movable block so as to intersect said first guide rail and a second movable block movably connected through a plurality of rolling members to said second guide rail; and said pivot supporting mechanism comprises a first ring and a second ring, said first ring being secured to said second movable block and said second ring being coupled through a plurality of rolling members with said first ring so as to be rotatable relative thereto and being secured to said second member.

4. The apparatus as claimed in claim 3, wherein:

said first guide rail has a pair of supporting walls, between which said first movable block is held through said rolling members.

5. The apparatus as claimed in claim 3, further comprises:

a linear actuator is disposed between said first guide rail arid said first movable block, for causing said first movable block to move.

6. The apparatus as claimed in claim 4, further comprises:

a linear actuator is disposed between said first guide rail and said first movable block, for causing said first movable block to move.

7. An apparatus for biaxial shifting motion and unaxial turning motion, which comprises:

a base;

a table;

a biaxial shifting motion guide mechanism for supporting said table so as to be movable relative to said base in a constant posture state along biaxial lines intersecting at right angles with each other; and a pivot supporting mechanism disposed on said biaxial shifting motion guide mechanism at an opposite side of said base, for pivotably supporting said table, wherein:

said biaxial shifting motion guide mechanism comprises a first guild rail secured to said base, a movable block connected through a plurality of rolling members to said first guide rail so as to be movable and a second guide rail connected through a plurality of rolling members to said movable block so as to be movable in a direction intersecting said first guide rail; and said pivot supporting mechanism comprises a first ring and a second ring, said first ring being secured to said second guide rail and said second ring being coupled through a plurality of rolling members with said first ring so as to be rotatable relative thereto and being secured to said table.

8. An apparatus for biaxial shifting motion and uniaxial turning motion, which comprises:

a base;

a table;

a biaxial shifting motion guide mechanism for supporting said table so as to be movable relative to said base in a constant posture state along biaxial lines intersecting at right angles with each other; and a pivot supporting mechanism disposed on said biaxial shifting motion guide mechanism at an opposite side of said base, for pivotably supporting said table, wherein:

said biaxial shifting motion guide mechanism comprises a first guide rail secured to said base, a first movable block connected through a plurality of rolling members to said first guide rail so as to be movable, a second guide rail secured to said first movable block so as to intersect said first guide rail and a second movable block movably connected through a plurality of rolling members to said second guide rail; and said pivot supporting mechanism comprises a first ring and a second ring, said first ring being secured to said second movable block and said second ring being coupled through a plurality of rolling members with said first ring so as to be rotatable relative thereto and being secured to said table.

* * * * *